US010613242B2

(12) United States Patent
Hirabayashi

(10) Patent No.: US 10,613,242 B2
(45) Date of Patent: Apr. 7, 2020

(54) AZIMUTHAL DETERMINATION OF SUBTERRANEAN ACOUSTIC REFLECTORS

(71) Applicant: Schlumberger Technology Corporation, Sugar Land, TX (US)

(72) Inventor: Nobuyasu Hirabayashi, Yokohama (JP)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 311 days.

(21) Appl. No.: 15/476,364

(22) Filed: Mar. 31, 2017

(65) Prior Publication Data

US 2018/0284308 A1  Oct. 4, 2018

(51) Int. Cl.
| | | |
|---|---|---|
| *G01V 1/50* | (2006.01) | |
| *E21B 49/00* | (2006.01) | |
| *E21B 47/00* | (2012.01) | |
| *E21B 47/024* | (2006.01) | |
| *G01V 1/52* | (2006.01) | |

(52) U.S. Cl.
CPC ............ *G01V 1/50* (2013.01); *G01V 1/52* (2013.01); *G01V 2001/526* (2013.01); *G01V 2200/16* (2013.01)

(58) Field of Classification Search
CPC ...... G01V 1/50; G01V 1/52; G01V 2001/526; G01V 2200/16
See application file for complete search history.

(56) References Cited

U.S. PATENT DOCUMENTS

| | | | |
|---|---|---|---|
| 5,548,562 A | 8/1996 | Helgerud et al. | |
| 6,002,339 A | 12/1999 | Norris | |
| 2005/0034917 A1* | 2/2005 | Mathiszik | G01V 1/44 181/108 |
| 2009/0217074 A1 | 8/2009 | Nichols et al. | |
| 2014/0222344 A1* | 8/2014 | Donderici | G01V 1/44 702/11 |

(Continued)

FOREIGN PATENT DOCUMENTS

WO   WO2011044352 A2   4/2011

OTHER PUBLICATIONS

Warpinski et al., "Microseismic Mapping of Hydraulic Fractures Using Multi-Level Wireline Receivers", SPE 30507—presentation at the SPE Annual Technical Conference & Exhibition held in Dallas, U.S.A., Oct. 22-25, 1995 (11 pages).

(Continued)

*Primary Examiner* — Regis J Betsch
*Assistant Examiner* — Jeremy A Delozier
(74) *Attorney, Agent, or Firm* — Eileen Pape

(57) ABSTRACT

Event amplitudes associated with a reflector in a subterranean formation are estimated, wherein the events are detected by azimuthally distributed receivers of an acoustic tool in a wellbore penetrating the subterranean formation. The receiver closest to an azimuthal position of the reflector is identified based on the estimated event amplitudes. The azimuthal position of the reflector is determined using data obtained from (1) the receiver identified as closest to the azimuthal position of the reflector, and (2) two others of the receivers that are azimuthally adjacent the receiver identified as closest to the azimuthal position of the reflector.

18 Claims, 12 Drawing Sheets

(56) References Cited

U.S. PATENT DOCUMENTS

2014/0301164 A1* 10/2014 Mandal .................. E21B 49/00
367/35

OTHER PUBLICATIONS

Schoenberg, "Elastic wave behavior across linear slip interfaces," J. Acoust. Soc. Am. 68(5), Nov. 1980, pp. 1516-1521.
Schoenberg, Fluid and solid motion in the neighborhood of a fluid-filled borehole due to the passage of a low-frequency elastic plane wave, Geophysics, vol. 51, No. 6 (Jun. 1986), pp. 1191-1205.
Peng et al., "Borehole effects on downhole seismic measurements", Geophysical Prospecting 41, 883-912, Oct. 1993.
Tang et al., "Single-well S-wave imaging using multicomponent dipole acoustic-log data", Geophysics, vol. 74, No. 6 (Nov.-Dec. 2009); p. WCA211-WCA223.
Esmersoy et al., Fracture and Stress Evaluation Using Dipole-Shear Anisotrophy Logs, SPWLA 36th Annual logging Symposium, Jun. 26-29, 1995 (12 pages).

* cited by examiner

AZIMUTHAL DETERMINATION OF SUBTERRANEAN ACOUSTIC REFLECTORS

BACKGROUND OF THE DISCLOSURE

A Borehole Acoustic Reflection Survey ("BARS") is utilized to image near-wellbore structures in a subterranean formation penetrated by the wellbore. Such imaging utilizes waveform data acquired by an acoustic tool conveyed within the wellbore. Such acoustic tools comprise acoustic transmitters and receivers operable to acquire the waveform data. That is, acoustic signals transmitted from a transmitter reflect from boundaries and fractures of the formation before being detected by the azimuthally spaced receivers. The detected signals are processed to generate the waveform data indicative of physical and/or other parameters of the formation. The BARS data provides a two-dimensional image, in directions of the longitudinal axis of the wellbore and the distance between the wellbore axis and the near-wellbore features ("reflectors") in the formation. The azimuthal location of each reflector is determined using differences between arrival times of the signals corresponding to the same reflector ("event signals") at the azimuthally spaced receivers, based on the assumption that the wavefield excited by the reflected wave in the wellbore is a plane wave. Thus, the recorded event signals are expressed by time shifts, and the amplitudes and shapes of signals are identical for the azimuthally spaced receivers.

However, in actual BARS data acquired in real wellbores, event signals received by the different receivers exhibit apparent amplitude differences for P-waves and SV-waves. The apparent amplitude differences are inconsistent with the above-described assumption that the wavefield excited by the reflected wave in the wellbore can be regarded as a plane wave. Consequently, the azimuthal locations of reflectors determined utilizing this assumption are inaccurate.

SUMMARY OF THE DISCLOSURE

This summary is provided to introduce a selection of concepts that are further described below in the detailed description. This summary is not intended to identify indispensable features of the claimed subject matter, nor is it intended for use as an aid in limiting the scope of the claimed subject matter.

The present disclosure introduces a method including estimating event amplitudes associated with a reflector in a subterranean formation. Azimuthally distributed receivers of an acoustic tool in a wellbore penetrating the subterranean formation detect the events. The receiver closest to an azimuthal position of the reflector is identified based on the estimated event amplitudes. The azimuthal position of the reflector is determined using data obtained from (i) the receiver identified as closest to the azimuthal position of the reflector, and (ii) two others of the receivers that are azimuthally adjacent the receiver identified as closest to the azimuthal position of the reflector.

The present disclosure also introduces an apparatus including a processing system having a processor and a memory including computer program code. The computer program code is executable by the processor for estimating event amplitudes associated with a reflector in a subterranean formation. Azimuthally distributed receivers of an acoustic tool in a wellbore penetrating the subterranean formation detect the events. The computer program code is also executable by the processor for identifying which receiver is closest to an azimuthal position of the reflector based on the estimated event amplitudes. The computer program code is also executable by the processor for determining the azimuthal position of the reflector using data obtained from (i) the receiver identified as closest to the azimuthal position of the reflector, and (ii) two others of the receivers that are azimuthally adjacent the receiver identified as closest to the azimuthal position of the reflector.

The present disclosure also introduces an apparatus including a non-transitory, tangible, computer-readable medium having instructions encoded thereon. The encoded instructions are for causing a processing system having a processor and a memory to estimate event amplitudes associated with a reflector in a subterranean formation. Azimuthally distributed receivers of an acoustic tool in a wellbore penetrating the subterranean formation detect the events. The encoded instructions are also for causing the processing system to identify which receiver is closest to an azimuthal position of the reflector based on the estimated event amplitudes. The encoded instructions are also for causing the processing system to determine the azimuthal position of the reflector using data obtained from (i) the receiver identified as closest to the azimuthal position of the reflector, and (ii) two others of the receivers that are azimuthally adjacent the receiver identified as closest to the azimuthal position of the reflector.

These and additional aspects of the present disclosure are set forth in the description that follows, and/or may be learned by a person having ordinary skill in the art by reading the material herein and/or practicing the principles described herein. At least some aspects of the present disclosure may be achieved via means recited in the attached claims.

BRIEF DESCRIPTION OF THE DRAWINGS

The present disclosure is understood from the following detailed description when read with the accompanying figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
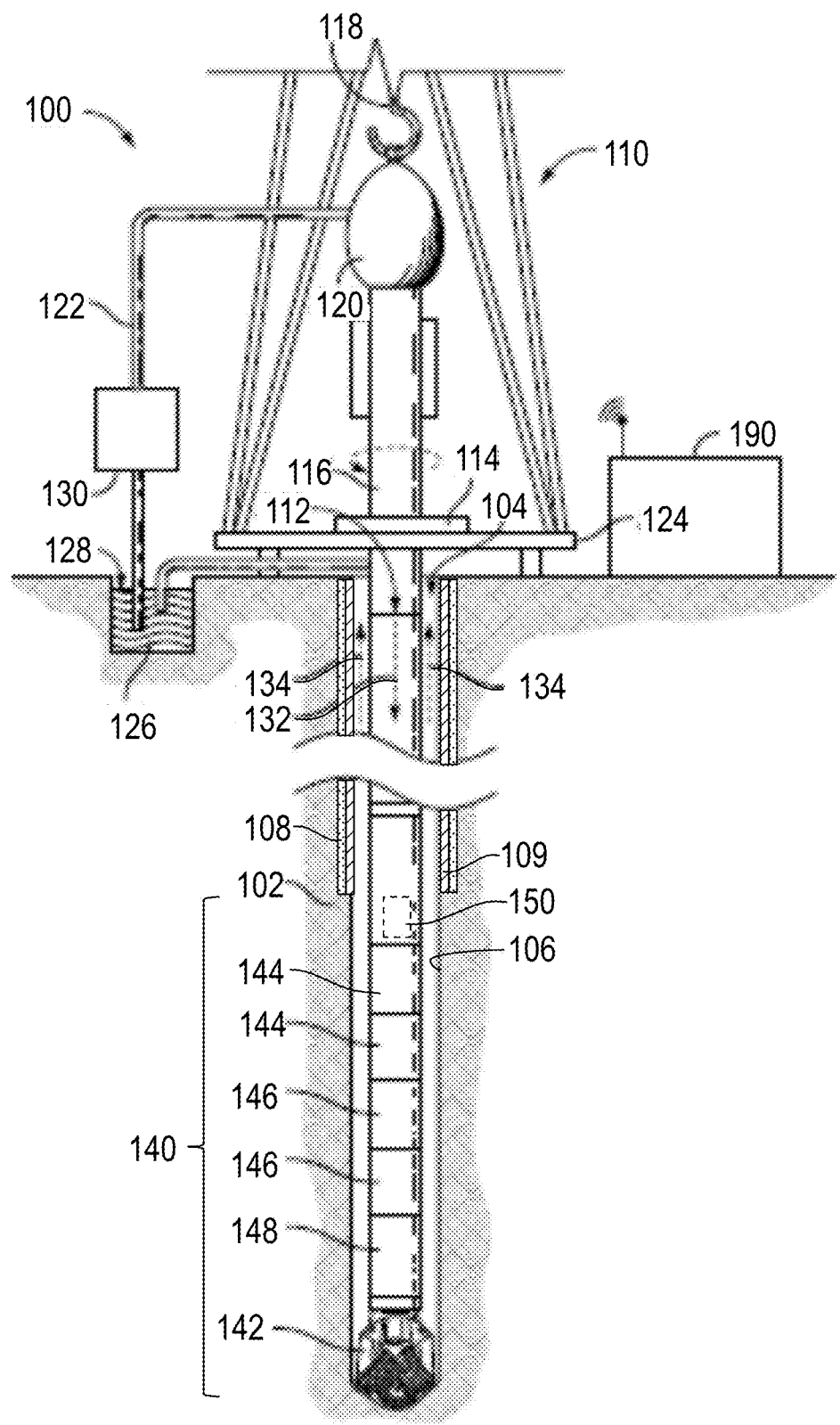
FIG. 1 is a schematic view of at least a portion of an example implementation of apparatus according to one or more aspects of the present disclosure.

It is to be understood that the following disclosure provides many different embodiments, or examples, for implementing different features of various embodiments. Specific examples of components and arrangements are described below to simplify the present disclosure. These are, of course, merely examples and are not intended to be limiting. In addition, the present disclosure may repeat reference numerals and/or letters in the various examples. This repetition is for simplicity and clarity, and does not in itself dictate a relationship between the various embodiments and/or configurations discussed.

The following description also describes aspects pertaining to primary compression waves ("P-waves"), horizontal shear waves ("SH-waves"), and vertical shear waves ("SV-waves"). The particle displacement vector of a P-wave is perpendicular to the wavefront of the P-wave, such that particle motions are in and opposite the direction of travel of the wavefront. In contrast, the particle displacement vectors of SH- and SV-waves are tangent to their wavefronts, such that particle motions are perpendicular to the travel directions of the wavefronts. However, aspects of the present disclosure are applicable to wellbores having at least portions that are substantially vertical (i.e., extending substantially parallel to the direction of gravity), substantially horizontal (i.e., extending substantially perpendicular to the direction of gravity), and/or at some orientation between vertical and horizontal, and the "vertical" and "horizontal" orientations of the shear waves are to be understood as being relative to the longitudinal axis of the wellbore at the depth of analysis. That is, the particle displacement vectors of SH-waves are perpendicular to the longitudinal axis of the wellbore, and the particle displacement vectors of SV-waves are perpendicular to the particle displacement vectors of SH-waves (i.e., in a plane containing the P-wave particle displacement vector and the longitudinal axis of the wellbore).

FIG. 1 is a schematic view of an example wellsite system 100 to which one or more aspects of the present disclosure may be applicable. The wellsite system 100 may be onshore or offshore. In the example wellsite system 100 shown in FIG. 1, a wellbore 104 is formed in one or more subterranean formation 102 by rotary drilling. Other example systems within the scope of the present disclosure may also or instead utilize directional drilling. While some elements of the wellsite system 100 are depicted in FIG. 1 and described below, it is to be understood that the wellsite system 100 may include other components in addition to, or in place of, those presently illustrated and described.

As shown in FIG. 1, a drillstring 112 suspended within the wellbore 104 comprises a bottom hole assembly (BHA) 140 that includes or is coupled with a drill bit 142 at its lower end. The surface system includes a platform and derrick assembly 110 positioned over the wellbore 104. The platform and derrick assembly 110 may comprise a rotary table 114, a kelly 116, a hook 118, and a rotary swivel 120. The drillstring 112 may be suspended from a lifting gear (not shown) via the hook 118, with the lifting gear being coupled to a mast (not shown) rising above the surface. An example lifting gear includes a crown block affixed to the top of the mast, a vertically traveling block to which the hook 118 is attached, and a cable passing through the crown block and the vertically traveling block. In such an example, one end of the cable is affixed to an anchor point, whereas the other end is affixed to a winch to raise and lower the hook 118 and the drillstring 112 coupled thereto. The drillstring 112 comprises one or more types of tubular members, such as drill pipes, threadedly attached one to another, perhaps including wired drilled pipe.

The drillstring 112 may be rotated by the rotary table 114, which engages the kelly 116 at the upper end of the drillstring 112. The drillstring 112 is suspended from the hook 118 in a manner permitting rotation of the drillstring 112 relative to the hook 118. Other example wellsite systems within the scope of the present disclosure may utilize a top drive system to suspend and rotate the drillstring 112, whether in addition to or instead of the illustrated rotary table system.

The surface system may further include drilling fluid or mud 126 stored in a pit or other container 128 formed at the wellsite. As described above, the drilling fluid 126 may be oil-based mud (OBM) or water-based mud (WBM). A pump 130 delivers the drilling fluid 126 to the interior of the drillstring 112 via a hose or other conduit 122 coupled to a port in the rotary swivel 120, causing the drilling fluid to flow downward through the drillstring 112, as indicated in FIG. 1 by directional arrow 132. The drilling fluid exits the drillstring 112 via ports in the drill bit 142, and then circulates upward through the annulus region between the outside of the drillstring 112 and the wall 106 of the wellbore 104, as indicated in FIG. 1 by directional arrows 134. In this manner, the drilling fluid 126 lubricates the drill bit 142 and carries formation cuttings up to the surface as it is returned to the container 128 for recirculation.

The BHA 140 may comprise one or more specially made drill collars near the drill bit 142. Each such drill collar may comprise one or more devices permitting measurement of downhole drilling conditions and/or various characteristic properties of the subterranean formation 102 intersected by the wellbore 104. For example, the BHA 140 may comprise one or more logging-while-drilling (LWD) modules 144, one or more measurement-while-drilling (MWD) modules 146, a rotary-steerable system and motor 148, and perhaps the drill bit 142. Of course, other BHA components, modules, and/or tools are also within the scope of the present disclosure, and such other BHA components, modules, and/or tools may be positioned differently in the BHA 140.

The LWD modules 144 may comprise a downhole acoustic tool for evaluating bonding quality of cement 108 securing a casing 109 that lines at least a portion of the wellbore 104, and/or for evaluating portions of the formation 102 surrounding the wellbore 104. Example aspects of such acoustic tools are described below.

The MWD modules 146 may comprise one or more devices for measuring characteristics of the drillstring 112 and/or the drill bit 142, such as for measuring weight-on-bit, torque, vibration, shock, stick slip, tool face direction, and/or inclination, among others. The MWD modules 156 may further comprise an apparatus (not shown) for generating electrical power to be utilized by the downhole system. This may include a mud turbine generator powered by the flow of the drilling fluid 126. Other power and/or battery systems may also or instead be employed.

The wellsite system 100 also includes a data processing system that can include one or more, or portions thereof, of the following: the surface equipment 190, control devices and electronics in one or more modules of the BHA 140 (such as a downhole controller 150), a remote computer system (not shown), communication equipment, and other equipment. The data processing system may include one or more computer systems or devices and/or may be a distributed computer system. For example, collected data or information may be stored, distributed, communicated to an operator, and/or processed locally or remotely.

The data processing system may, individually or in combination with other system components, perform the methods and/or processes described below, or portions thereof. For example, such data processing system may include processor capability for collecting data relating to the amplitude and travel/arrival times of acoustic signals transmitted and received by an acoustic tool of the LWD modules 144. Methods and/or processes within the scope of the present disclosure may be implemented by one or more computer programs that run in a processor located, for example, in one or more modules of the BHA 140 and/or the surface equipment 190. Such programs may utilize data received from the BHA 140 via mud-pulse telemetry and/or other telemetry means, and/or may transmit control signals to operative elements of the BHA 140. The programs may be stored on a tangible, non-transitory, computer-usable storage medium associated with the one or more processors of the BHA 140 and/or surface equipment 190, or may be stored on an external, tangible, non-transitory, computer-usable storage medium that is electronically coupled to such processor(s). The storage medium may be one or more known or future-developed storage media, such as a magnetic disk, an optically readable disk, flash memory, or a readable device of another kind, including a remote storage device coupled over a communication link, among other examples.

Figure 2:
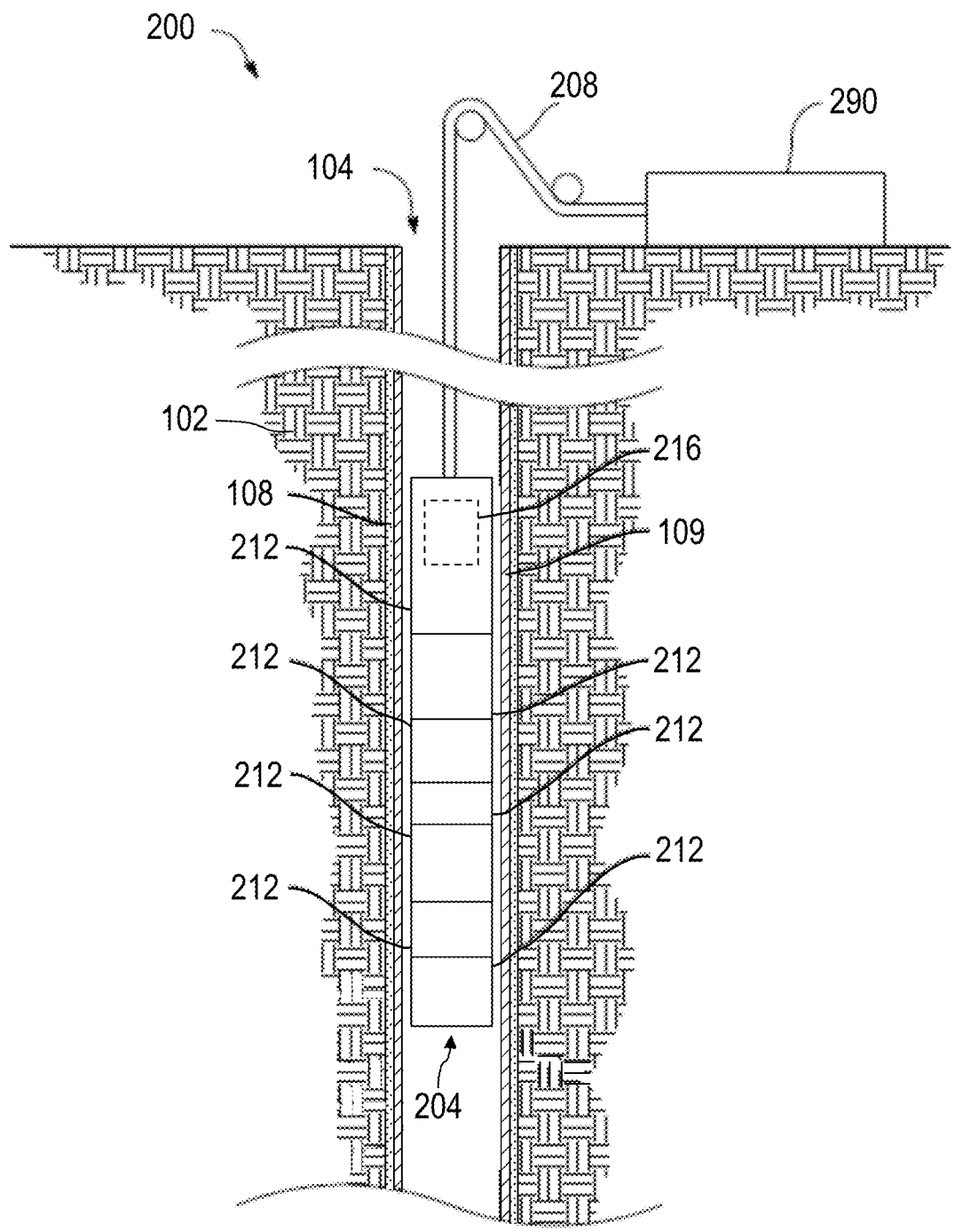
FIG. 2 is a schematic view of at least a portion of an example implementation of apparatus according to one or more aspects of the present disclosure.

FIG. 2 is a schematic view of another example wellsite system 200 to which one or more aspects of the present disclosure may be applicable. The wellsite system 200 may be onshore or offshore. In the example wellsite system 200 shown in FIG. 2, a tool string 204 is conveyed into the wellbore 104 via a wireline and/or other conveyance means 208. As with the wellsite system 100 shown in FIG. 1, the example wellsite system 200 of FIG. 2 may be utilized for evaluation of the wellbore 104, the cement 108 securing the casing 109 within the wellbore 104, and/or the formation 102 penetrated by the wellbore 104.

The tool string 204 is suspended in the wellbore 104 from the lower end of the wireline 208, which may be a multi-conductor logging cable spooled on a winch (not shown). The wireline 208 may include at least one conductor that facilitates data communication between the tool string 204 and surface equipment 290 disposed on the surface. The surface equipment 290 may have one or more aspects in common with the surface equipment 190 shown in FIG. 1.

The tool string 204 and wireline 208 may be structured and arranged with respect to a service vehicle (not shown) at the wellsite. For example, the wireline 208 may be connected to a drum (not shown) at the wellsite surface, permitting rotation of the drum to raise and lower the tool string 204. The drum may be disposed on a service truck or a stationary platform. The service truck or stationary platform may further contain the surface equipment 290.

The tool string 204 comprises one or more elongated housings encasing various electronic components and modules schematically represented in FIG. 2. For example, the illustrated tool string 204 includes several modules 212, at least one of which may be or comprise at least a portion of an acoustic tool as described below. Other implementations of the downhole tool string 204 within the scope of the present disclosure may include additional or fewer components or modules relative to the example implementation depicted in FIG. 2.

The wellsite system 200 also includes a data processing system that can include one or more, or portions thereof, of the following: the surface equipment 290, control devices and electronics in one or more modules of the tool string 204 (such as a downhole controller 216), a remote computer system (not shown), communication equipment, and other equipment. The data processing system may include one or more computer systems or devices and/or may be a distributed computer system. For example, collected data or information may be stored, distributed, communicated to an operator, and/or processed locally or remotely.

The data processing system may, individually or in combination with other system components, perform the methods and/or processes described below, or portions thereof. For example, such data processing system may include processor capability for collecting data relating to the evaluation of the cement 108 and/or the formation 102 according to one or more aspects of the present disclosure. Methods and/or processes within the scope of the present disclosure may be implemented by one or more computer programs that run in a processor located, for example, in one or more modules 212 of the tool string 204 and/or the surface equipment 290. Such programs may utilize data received from the downhole controller 216 and/or other modules 212 via the wireline 208, and may transmit control signals to operative elements of the tool string 204. The programs may be stored on a tangible, non-transitory, computer-usable storage medium associated with the one or more processors of the downhole controller 216, other modules 212 of the tool string 204, and/or the surface equipment 290, or may be stored on an external, tangible, non-transitory, computer-usable storage medium that is electronically coupled to such processor(s). The storage medium may be one or more known or future-developed storage media, such as a magnetic disk, an optically readable disk, flash memory, or a readable device of another kind, including a remote storage device coupled over a communication link, among other examples.

While FIGS. 1 and 2 illustrate example wellsite systems 100 and 200, respectively, that convey a downhole tool/string into a wellbore, other example implementations consistent with the scope of this disclosure may utilize other conveyance means to convey a tool into a wellbore, including coiled tubing, tough logging conditions (TLC), slickline, and others. Additionally, other downhole tools within the scope of the present disclosure may comprise components in a non-modular construction also consistent with the scope of this disclosure.

Figure 3:
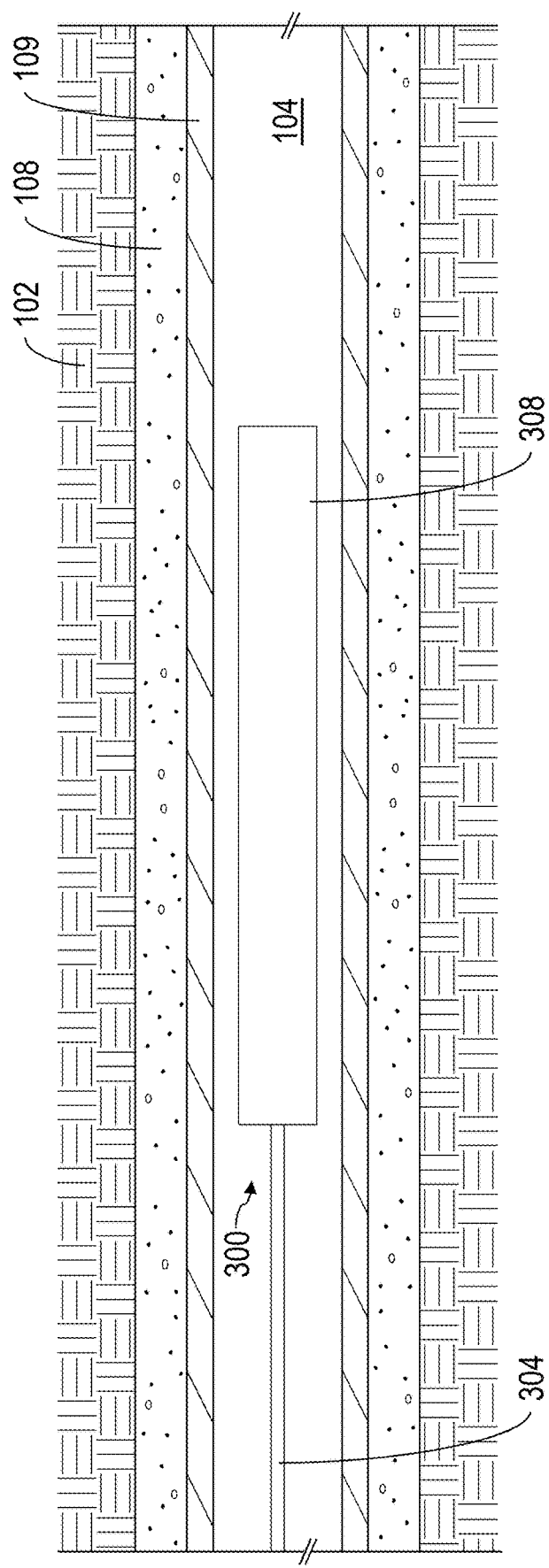
FIG. 3 is a schematic view of a portion of an example implementation of apparatus according to one or more aspects of the present disclosure.

FIG. 3 is a schematic sectional view of at least a portion of an example implementation of an acoustic tool 300 according to one or more aspects of the present disclosure. The acoustic tool 300 may be implemented as one or more of the LWD modules 144 shown in FIG. 1 and/or one or more of the modules 212 shown in FIG. 2, and may thus be conveyed within the wellbore 104 via drill string, wireline, and/or other conveyance means 304 schematically depicted in FIG. 3. The acoustic tool 300 may be utilized to evaluate the cement 108 securing the casing 109 within the wellbore 104, and/or to evaluate portions of the formation 102 surrounding the wellbore 104, according to one or more aspects of the present disclosure. In FIG. 3, the acoustic tool 300 is depicted as being disposed in a substantially horizontal portion of the wellbore 104. However, the acoustic tool 300 may also be utilized in other deviated or vertical portions of a wellbore. The acoustic tool 300 may include one or more housings (collectively referred to hereafter as "the housing")

308 partially, substantially, or hermetically encasing operational components described below.

Figure 4:
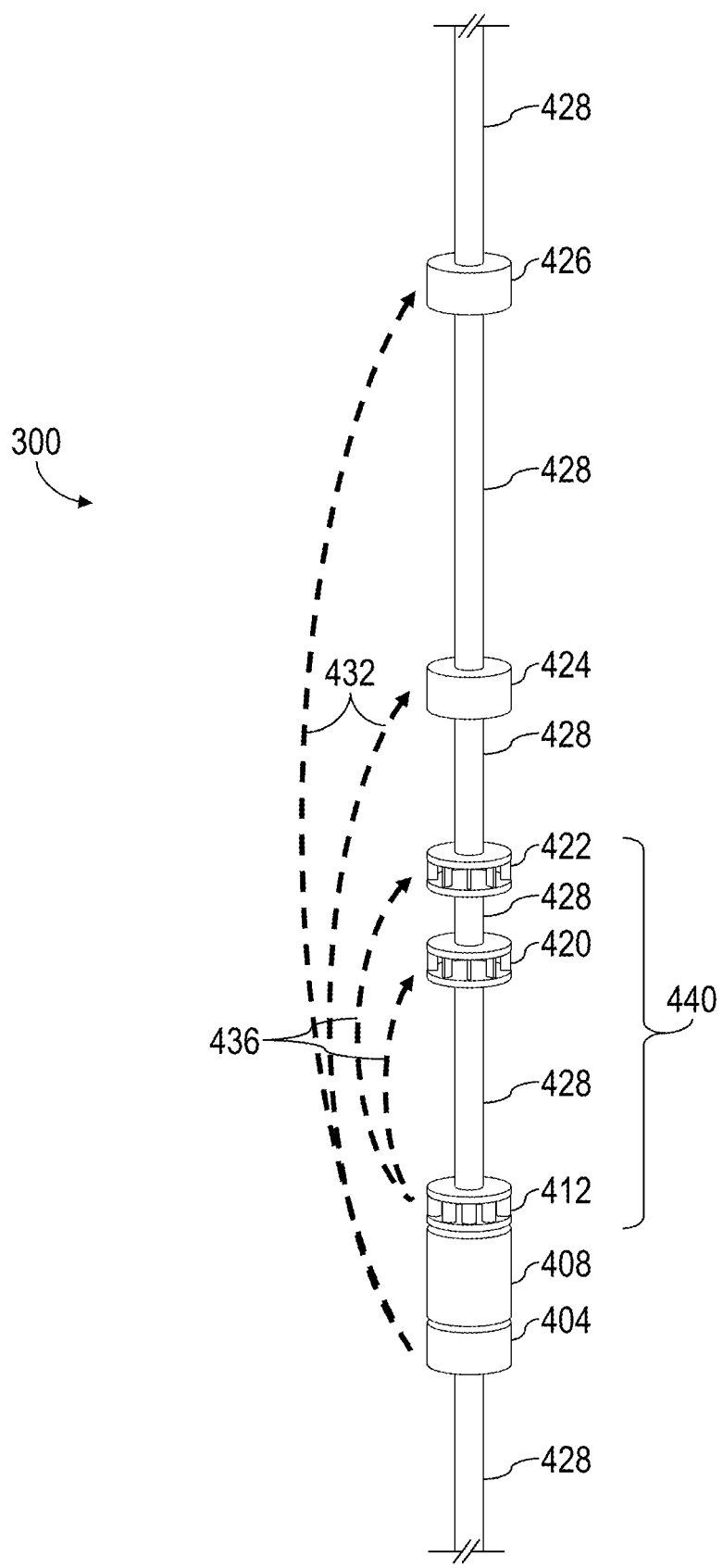
FIG. 4 is a schematic view of a portion of the apparatus shown in FIG. 3.

FIG. 4 is a perspective view of a portion of the acoustic tool 300 having been removed from the wellbore 104, and with the housing 308 removed for clarity. The acoustic tool 300 includes one or more of a low-frequency transmitter unit 404, electronics 408, a high-frequency transmitter unit 412, one or more high-frequency receiver units 420, 422, and one or more low-frequency receiver units 424, 426, as well as various structural members 428 interconnecting such components. To increase clarity and aid with understanding, additional features and components of the acoustic tool 300 not relevant to the following description are omitted in the figures, but it is understood that such features and components may exist in various implementations within the scope of the present disclosure. It is also noted that other implementations of an acoustic tool within the scope of the present disclosure may omit one or more of the components depicted in the figures.

The electronics 408 may be, comprise, or form at least a portion of the downhole controller 150 shown in FIG. 1 or the downhole controller 216 shown in FIG. 2. The electronics 408 are operable to, for example, cause the transmitter units 404, 412 to emit acoustic signals 432, 436 and detect the acoustic signals 432, 436 with the corresponding receiver units 420, 422, 424, 426, such as for detecting the travel time of the acoustic signals 432, 436 between the transmitter units 404, 412 and the corresponding receiver units 420, 422, 424, 426, as well as amplitudes of the acoustic signals 432, 436 received at the receiver units 420, 422, 424, 426.

Figure 5:
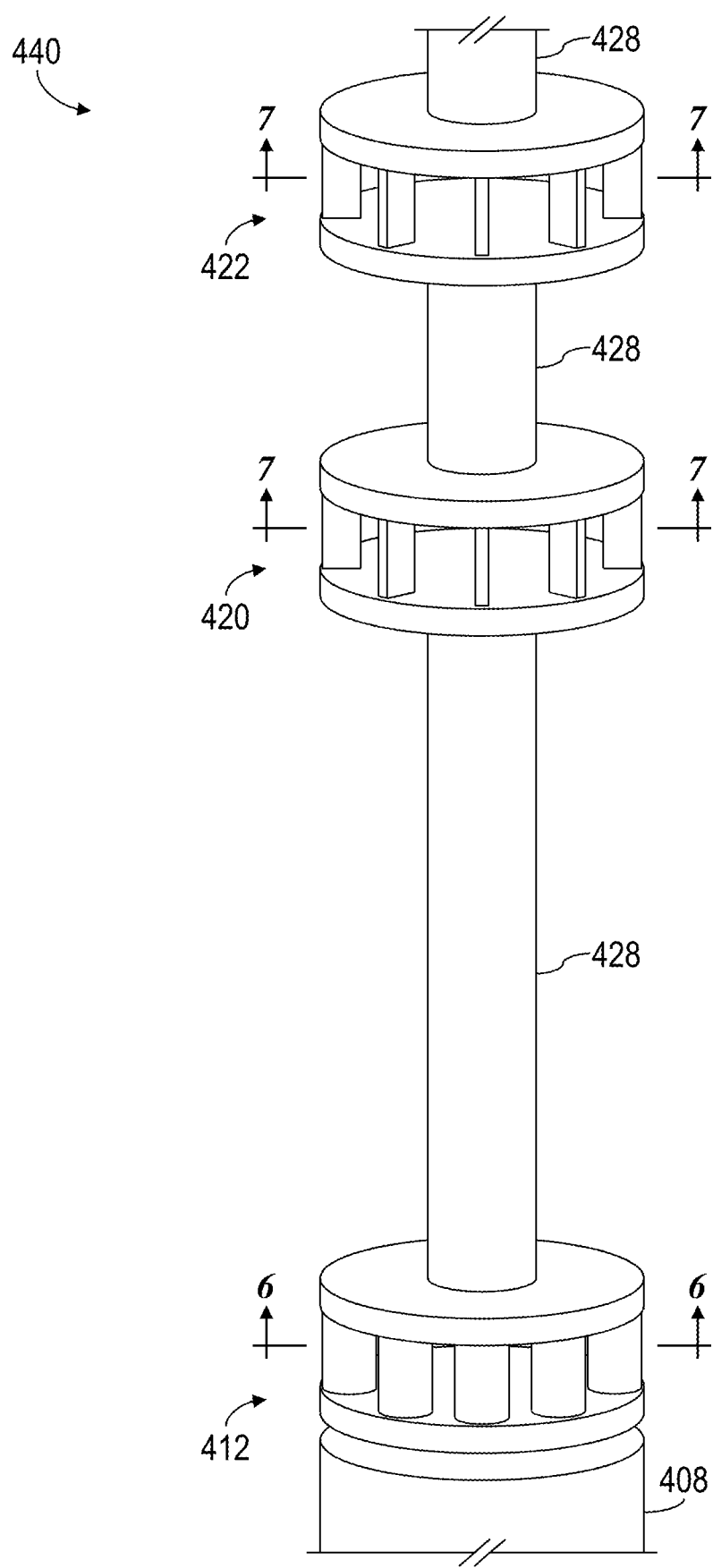
FIG. 5 is a schematic view of a portion of the apparatus shown in FIG. 4.

FIG. 5 is a perspective view of a mapping portion 440 of the acoustic tool 300 shown in FIG. 4. For example, the mapping portion 440 may comprise the high-frequency transmitter unit 412 and one or more high-frequency receiver units 420, 422, as well as various structural members 428.

Figure 6:
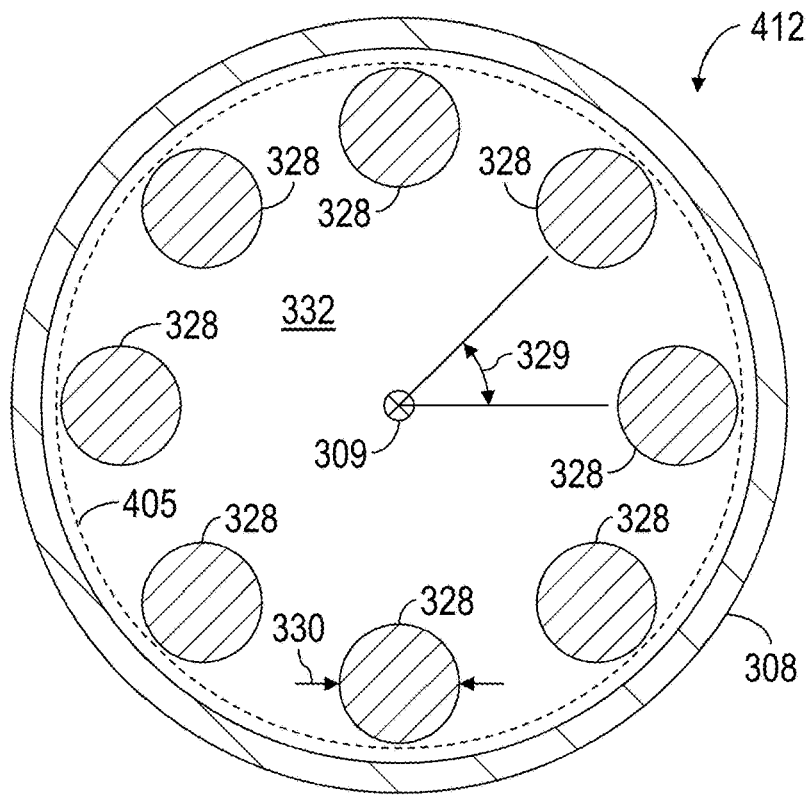
FIGS. 6 and 7 are sectional views of the apparatus shown in FIG. 5.

FIG. 6 is a sectional schematic view of at least a portion of an example implementation of the high-frequency transmitter unit 412. The example high-frequency transmitter unit 412 comprises eight transmitters 328 positionally fixed within the housing 308 via an attachment structure 332. The transmitters 328 are independently and/or collectively operable to excite acoustic energy to induce monopole, dipole, and other higher order azimuthal modes, depending on which transmitters 328 are excited simultaneously and their polarity, to generate acoustic signals 436 as depicted in FIG. 4. In addition, by exciting each transmitter 328 one-by-one, a unipole excitation may also be achieved. Each transmitter 328 may comprise a substantially cylindrical portion of piezoelectric ceramic material, such as PCT C-64, and/or other materials permitting each transmitter 328 to by independently operated or activated as a point source. The frequency of the acoustic signals 436 generated by the transmitters 328 may vary within the scope of the present disclosure, such as between about 20 kHz and about 200 kHz, with an example implementation at a frequency of about 100 kHz.

The transmitters 328 are distributed azimuthally around a central axis 309 of the housing 308. The azimuthal spacing 329 between neighboring ones of the transmitters 328 may be about 45 degrees. Each transmitter 328 may have a diameter 330 ranging between about 1.5 centimeters (cm) and about 5 cm, and a length (extending into and out of the page in FIG. 6) ranging between about 2.5 cm and about 10 cm. However, other numbers, spacings, shapes, and sizes of the transmitters 328 are also within the scope of the present disclosure.

The low-frequency transmitter unit 404 may be substantially similar to the high-frequency transmitter unit 412, but is depicted in FIG. 4 as a conventional monopole source. For example, such implementations may comprise a single transmitter, represented in FIG. 6 by a dashed-line circle 405 encompassing the array of smaller transmitters 328. Similarly, the low-frequency receivers 424, 426 may also be single element receivers, such as may be conventionally utilized with monopole sources. Implementations within the scope of the present disclosure may also comprise other types and arrangements of acoustic transmitters and receivers, whether instead of or in addition to the example implementations depicted in the figures.

Figure 7:
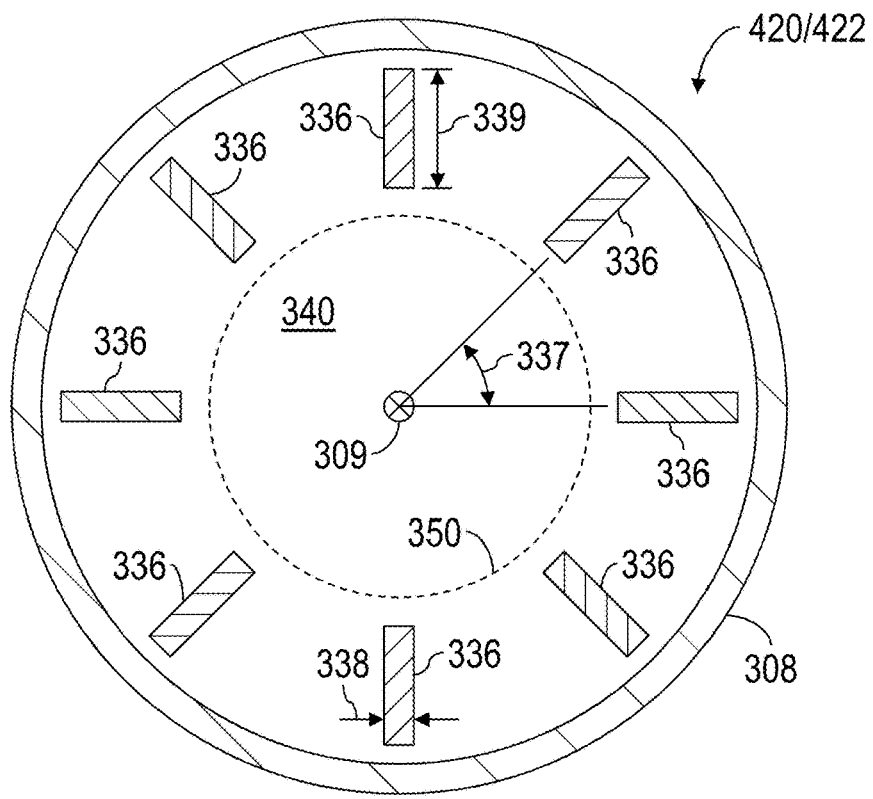

FIG. 7 is a sectional schematic view of at least a portion of an example implementation of the high-frequency receiver units 420, 422. The example high-frequency receiver units 420, 422 each comprise eight receivers 336 positionally fixed within the housing 308 via an attachment structure 340. The receivers 336 are each independently operable to detect acoustic energy excited by the high-frequency transmitter unit 412, whether transmitted as unipole, monopole, dipole, and other higher order azimuthal modes. Thus, the receivers 336 may be used for measuring amplitudes and travel times of the acoustic signals 436.

The receivers 336 are distributed azimuthally around the central axis 309 of the housing 308. The azimuthal spacing 337 between neighboring ones of the receivers 336 may be about 45 degrees, and each receiver 336 may be substantially aligned azimuthally with a corresponding one of the high-frequency transmitters 328, or the array of high-frequency receivers 336 may be azimuthally offset from the array of high-frequency transmitters 328, such as in implementations in which the array of high-frequency receivers 336 is rotated 20-25 degrees around the central axis 309 relative to the array of high-frequency transmitters 328. Each receiver 336 may have a width 338 ranging between about 0.5 cm and about 2 cm, a length 339 ranging between about 1.5 cm and about 5 cm, and a height (extending into and out of the page in FIG. 7) ranging between about 2.5 cm and about 10 cm. However, other numbers, spacings, shapes, and sizes of the receivers 336 are also within the scope of the present disclosure.

Each receiver 336 may comprise a substantially rectangular portion of piezoelectric ceramic material, such as PCT C-64, and and/or other materials permitting each receiver 336 to be independently operated or activated as an individual receiver at the operating frequencies described above with respect to the high-frequency transmitter unit 412. Implementations within the scope of the present disclosure may also comprise other types and arrangements of acoustic receivers, whether instead of or in addition to the example implementations depicted in the figures.

Among other aspects, the present disclosure introduces methods for numerically reproducing the above-described amplitude differences of event signals detected by the azimuthally spaced receivers 336, thus clarifying relations between the intensities of signals and the incoming direction of event signals. The results are expressed as time-domain synthetic waveforms. To determine the synthetic waveforms for the incident plane waves, the frequency responses are determined at discrete frequencies and then converted via Fast Fourier Transform ("FFT") to the time-domain synthetic waveforms. Consequently, the present disclosure introduces fast and easy methods to analyze the waveforms for the incident waves for various situations, such as the types and directions of incoming signals.

The existence of the acoustic tool 300 inside the fluid-filled wellbore 104 influences the waveforms recorded by the azimuthally spaced receivers 336. Thus, the acoustic tool is modeled, and the waveforms are determined for models with and without the acoustic tool existing in the wellbore.

The following description is of an example of the model without the acoustic tool 300 in the wellbore 104, such that the wellbore 104 is treated as being filled with just fluid. However, it is to be understood that the following describes one example among myriad others that may also be utilized within the scope of the present disclosure.

Various models may be utilized for the computation without the existence of the acoustic tool 300 in the wellbore 104. However, the volume of the receivers 336 may be ignored, and the receivers 336 may be treated as point receivers. The receivers 336 are sealed in the housing 308, and the housing 308 (or at least the portion of the housing 308 sealingly containing the receivers 336 of one or more receiver units 420/422) is filled with oil or another liquid. Each receiver 336 is placed next to a metal cylinder axially aligned with the axis 309, as indicated by the dashed-line circle 350 in FIG. 7. In the numerical computation accounting for the existence of the acoustic tool 300 in the wellbore 104, the existence of the housing 208 may be ignored, and the liquid surrounding the receivers 336 may be assumed to have the material properties of the fluid in the wellbore 104.

Plane waves in cylindrical coordinates may be expressed with the scalar potentials set forth below in Equations (1)-(3).

$$\phi_p = -\frac{i\alpha V(\omega)}{\omega}\left[J_0(k_L r) + 2\sum_{n=1}^{N} i^n J_n(k_L r)\cos n\theta\right] \quad (1)$$

$$\zeta_p = -\frac{\beta^2 V(\omega)}{\omega^2 \sin\delta}\left[J_0(k_S r) + 2\sum_{n=1}^{N} i^n J_n(k_S r)\cos n\theta\right] \quad (2)$$

$$\psi_p = -\frac{i\beta^2 V(\omega)}{\omega \sin\delta}\left[J_0(k_S r) + 2\sum_{n=1}^{N} i^n J_n(k_S r)\sin n\theta\right] \quad (3)$$

where:
$\phi_p$ is scalar potential for the incident P-wave;
i is azimuthal index of the receivers;
$\alpha$ is P-velocity of the subterranean formation;
$V(\omega)$ is frequency response of the plane wave;
$\omega$ is angular frequency;
$J_n$ is the Bessel function of order n;
$k_L$ is the radial wavenumber of the P-wave, which can be expressed as $k_L^2=(\omega/\alpha)^2-k_z^2$, where $k_z$ is the wavenumber in the z direction;
r is radial distance from the center of the wellbore 104;
N is the maximum number of n;
$\theta$ is azimuth of the receiver 336;
$\zeta_p$ is scalar potential for the incident SV-wave;
$\beta$ is S-velocity of the subterranean formation;
$k_S$ is the radial wavenumber of the S-wave, which can be expressed as $k_S^2=(\beta/\alpha)^2-k_z^2$; and
$\psi_p$ is scalar potential for the incident SH-wave.

In the analytical solution, the summation is taken for N approaching infinity. In the present example, however, N=20 is utilized for the numerical computation and the differences of computational results are negligible for the larger number of N. The general solution of the scalar potential of fluid velocity may be expressed using the Bessel functions as set forth below in Equation (4).

$$\phi_f = -\frac{i\alpha_f V(\omega)}{\omega}\left[A_0 J_0(k_f r) + 2\sum_{n=1}^{N} i^n (A_n \cos n\theta + A'_n \sin n\theta)J_n(k_f r)\right] \quad (4)$$

where:
$\phi_f$ is scalar potential of fluid velocity;
$\alpha_f$ is P-velocity of fluid;
$k_f$ is the radial wavenumber of the acoustic wave in the fluid, which can be expressed as $k_f^2=(\omega/\alpha_f)^2-k_z^2$; and
$A_0$, $A_n$, and $A_n'$ are unknown coefficients determined by solving the boundary conditions.

Using the scalar potential of fluid velocity, the pressure p and radial velocity $v_r$ may be determined as set forth below in Equations (5) and (6).

$$p = i\omega\rho_f \phi_f \quad (5)$$

$$v_r = \frac{\partial \phi_f}{\partial r} \quad (6)$$

where $\rho_f$ is fluid density.

The general solutions of scalar potentials associated with the formation velocities may be expressed using the Hankel functions of the first kind, as set forth below in Equations (7)-(9).

$$\phi = \frac{i\alpha V(\omega)}{\omega}\left[B_0 H_0^{(1)}(k_L r) + 2\sum_{n=1}^{N} i^n (B_n \cos n\theta + B'_n \sin n\theta)H_n^{(1)}(k_L r)\right] \quad (7)$$

$$\zeta = \frac{\beta^2 V(\omega)}{\omega^2}\left[C_0 H_0^{(1)}(k_S r) + 2\sum_{n=1}^{N} i^n (C_n \cos n\theta + C'_n \sin n\theta)H_n^{(1)}(k_S r)\right] \quad (8)$$

$$\psi = \frac{i\beta^2 V(\omega)}{\omega}\left[-D'_0 H_0^{(1)}(k_S r) + 2\sum_{n=1}^{N} i^n (D_n \sin n\theta + D'_n \cos n\theta)H_n^{(1)}(k_S r)\right] \quad (9)$$

where:
$\phi$ is scalar potential of the P-wave;
$\zeta$ is scalar potential of the SV-wave;
$\psi$ is scalar potential of the SH-wave;
$H_n^{(1)}$ is the Hankel function of the first kind of order n; and
$B_0$, $B_n$, $B_n'$, $C_0$, $C_n$, $C_n'$, $D_0'$, $D_n$, and $D_n'$, are unknown coefficients determined by solving the boundary conditions.

Velocities and stresses at the wellbore wall may be expressed as set forth below in Equations (10)-(16).

$$v_r = \frac{\partial \phi}{\partial r} + \frac{1}{r}\frac{\partial \psi}{\partial \theta} + ik_z\frac{\partial \zeta}{\partial r} \quad (10)$$

$$v_\theta = \frac{1}{r}\frac{\partial \phi}{\partial \theta} + \frac{\partial \psi}{\partial r} + \frac{ik_z}{r}\frac{\partial \zeta}{\partial \theta} \quad (11)$$

$$v_z = ik_z - (\nabla^2 + k_z^2)\zeta \quad (12)$$

$$\nabla^2 = \frac{\partial^2}{\partial r^2} + \frac{1}{r}\frac{\partial}{\partial r} + \frac{1}{r^2}\frac{\partial}{\partial \theta^2} - k_z^2 \quad (13)$$

-continued $$-i\omega\tau_{rr} = -\rho\omega^2 \frac{\alpha^2 - 2\beta^2}{\alpha^2}\phi + 2\rho\beta^2 \frac{\partial v_r}{\partial r} \quad (14)$$

$$-i\omega\tau_{r\theta} = \rho\beta^2 \left[\frac{\partial v_\theta}{\partial r} - \frac{u_\theta}{r} + \frac{1}{r}\frac{\partial u_r}{\partial \theta}\right] \quad (15)$$

$$-i\omega\tau_{rz} = \rho\beta^2 \left[ik_z u_r + \frac{\partial v_z}{\partial r}\right] \quad (16)$$

where:
$\nabla^2$ is the Laplace operator;
$\rho$ is formation density;
$u_\theta$ is tangential velocity;
$u_r$ is radial velocity; and
$\tau_{rr}$, $\tau_{rr}$, and $\tau_{rr}$ the elastic stress tensors.

For the plane waves $\phi_p$, $\zeta_p$, and $\psi_p$, velocities and stresses may be computed just for corresponding scalar potentials using Equations (10)-(16). The equations of boundary conditions may be constructed for each n as set forth below in Equation (17).

$$-\begin{pmatrix} v_r^{Fl} \\ -p^{Fl} \\ 0 \\ 0 \end{pmatrix} + \begin{pmatrix} v_r^{Sc} \\ \tau_{rr}^{Sc} \\ \tau_{rz}^{Sc} \\ \tau_{r\theta}^{Sc} \end{pmatrix} = -\begin{pmatrix} v_r^{Pl} \\ \tau_{rr}^{Pl} \\ \tau_{rz}^{Pl} \\ \tau_{r\theta}^{Pl} \end{pmatrix} \quad (17)$$

where the superscripts Fl, Sc, and Pl correspond to "fluid," "scattering wave," and "plane wave," respectively.

By using the scalar potentials, velocity and stress components may be given and the boundary conditions may be expressed as set forth below in Equation (18).

$$(Q_n M_n)A_n = -E_n \quad (18)$$

where $Q_n$ and $M_n$ are 4×1 and 4×3 sub-matrices, respectively.

For n>0, $\cos(n\theta)$ or $\sin(n\theta)$ is multiplied in each row, and they are canceled. The elements in $Q_n$ may be given as set forth below in Equations (19)-(22) set forth below.

$$q_1 = -\frac{i}{\Omega_f}[nJ_n(K_f) - K_f J_{n+1}(K_f)] \quad (19)$$

$$q_2 = -\frac{\rho_f \alpha_f}{\rho\beta} J_n(K_f) \quad (20)$$

$$q_3 = 0 \quad (21)$$

$$q_4 = 0 \quad (22)$$

where:
$\Omega_f = \omega\, r_b/\alpha_f$; and
$K_f = k_f r_b$.
$M_n$ may be the matrix of the form as set forth below in Equation (23).

$$M_n = \begin{pmatrix} m_{11} & m_{12} & m_{13} \\ m_{21} & m_{22} & m_{23} \\ m_{31} & m_{32} & m_{33} \\ m_{41} & m_{42} & m_{43} \end{pmatrix} \quad (23)$$

The elements of $M_n$ may be as set forth below in Equations (24)-(35).

$$m_{11} = -\frac{i}{\Omega_L}[nH_n^{(1)}(K_L) - K_L H_{n+1}^{(1)}(K_L)] \quad (24)$$

$$m_{21} = -\frac{i}{\Omega_S \Omega_L}[(-2n^2 + 2n + \Omega_S^2 - 2K_z^2)H_n^{(1)}(K_L) - 2K_L H_{n+1}^{(1)}(K_L)] \quad (25)$$

$$m_{31} = \frac{2iK_z}{\Omega_S \Omega_L}[nH_n^{(1)}(K_L) - K_L H_{n+1}^{(1)}(K_L)] \quad (26)$$

$$m_{41} = \frac{2n}{\Omega_S \Omega_L}[(n-1)H_n^{(1)}(K_L) - K_L H_{n+1}^{(1)}(K_L)] \quad (27)$$

$$m_{12} = -\frac{iK_z}{\Omega_S^2}[nH_n^{(1)}(K_S) - K_S H_{n+1}^{(1)}(K_S)] \quad (28)$$

$$m_{22} = -\frac{2K_z}{\Omega_S^3}[-(n^2 - n - K_S^2)H_n^{(1)}(K_S) - K_S H_{n+1}^{(1)}(K_S)] \quad (29)$$

$$m_{32} = -\frac{i(K_S^2 - K_z^2)}{\Omega_S^3}[nH_n^{(1)}(K_S) - K_S H_{n+1}^{(1)}(K_S)] \quad (30)$$

$$m_{42} = \frac{2nK_z}{\Omega_S^3}[(n-1)H_n^{(1)}(K_S) - K_S H_{n+1}^{(1)}(K_S)] \quad (31)$$

$$m_{13} = \frac{in}{\Omega_S} H_n^{(1)} K_S \quad (32)$$

$$m_{23} = -\frac{2n}{\Omega_S^2}[(n-1)H_n^{(1)}(K_S) - K_S H_{n+1}^{(1)}(K_S)] \quad (33)$$

$$m_{33} = -\frac{inK_z}{\Omega_S^2} H_n^{(1)} K_S \quad (34)$$

$$m_{43} = \frac{1}{\Omega_S^2}[-(2n^2 - 2n - K_S^2)H_n^{(1)}(K_S) - 2K_S H_{n+1}^{(1)}(K_S)] \quad (35)$$

where:
$\Omega_L = \omega\, r_b/\alpha$;
$K_L = k_L r_b$;
$\Omega_S = \omega\, r_b/\beta$;
$K_z = k_z r_b$; and
$K_S = k_S r_b$.

$A_n$ is a vector of unknown coefficients and may be as set forth below in Equation (36) for P- and SV-plane waves, and as set forth below in Equation (37) for SH-plane wavers.

$$A_n = (A_n, B_n, C_n, D_n)^T \quad (36)$$

$$A_n = (A'_n, B'_n, C'_n, D'_n)^T \quad (37)$$

$E_n$ is a column vector of incident plane waves, whose elements are given as set forth below in Equations (38)-(41) for the incident P-plane waves, in Equations (42)-(45) for the incident SV-plane waves, and in Equations (46)-(49) for the incident SH-plane waves, and where the signs of $e_4^P$ and $e_4^{SV}$ are flipped so that $E_n$ is consistent with $M_n$ in comparison to Equation (18).

$$e_1^P = -\frac{i}{\Omega_L}[nJ_n(K_L) - K_L J_{n+1}(K_L)] \quad (38)$$

$$e_2^P = -\frac{i}{\Omega_S \Omega_L}[(-2n^2 + 2n + \Omega_S^2 - 2K_z^2)J_n(K_L) - 2K_L J_{n+1}(K_L)] \quad (39)$$

$$e_3^P = \frac{2iK_z}{\Omega_S \Omega_L}[nJ_n(K_L) - K_L J_{n+1}(K_L)] \quad (40)$$

$$e_4^P = \frac{2n}{\Omega_S \Omega_L}[(n-1)J_n(K_L) - K_L J_{n+1}(K_L)] \quad (41)$$

-continued $$e_1^{SV} = -\frac{iK_z \sin\delta}{\Omega_S^2}[nJ_n(K_S) - K_S J_{n+1}(K_S)] \quad (42)$$

$$e_2^{SV} = -\frac{2K_z}{\Omega_S^3 \sin\delta}[-(n^2 - n - K_S^2)J_n(K_S) - 2K_S J_{n+1}(K_S)] \quad (43)$$

$$e_3^{SV} = -\frac{i(K_S^2 - K_z^2)}{\Omega_S^2 \sin\delta}[nJ_n(K_S) - K_S J_{n+1}(K_S)] \quad (44)$$

$$e_4^{SV} = \frac{2nK_z}{\Omega_S^3 \sin\delta}[(n-1)J_n(K_S) - K_S J_{n+1}(K_S)] \quad (45)$$

$$e_1^{SH} = \frac{in}{\Omega_S \sin\delta} J_n(K_S) \quad (46)$$

$$e_2^{SH} = -\frac{2n}{\Omega_S^3 \sin\delta}[(n-1)J_n(K_S) - K_S J_{n+1}(K_S)] \quad (47)$$

$$e_3^{SH} = -\frac{inK_z}{\Omega_S^2 \sin\delta} J_n(K_S) \quad (48)$$

$$e_4^{SH} = \frac{1}{\Omega_S^2 \sin\delta}[-(2n^2 - 2n - K_S^2)J_n(K_S) - 2K_S J_{n+1}(K_S)] \quad (49)$$

The example model described above in Equations (1)-(49) can be modified to include the effect of the acoustic tool 300 inside the fluid-filled wellbore 104. The scalar potential of fluid for such model may be expressed using the Bessel and Hankel functions as set forth below in Equation (50), and the general solutions of scalar potentials associated with the acoustic tool may be expressed using the Bessel function as set forth below in Equations (51)-(53).

$$\phi_f = \frac{i\alpha_f V(\omega)}{\omega}\left[A_0 J_0(k_f r) + 2\sum_{n=1}^N i^n(A_n \cos n\theta + A'_n \sin n\theta)J_n(k_f r)\right] + \quad (50)$$

$$\frac{i\alpha_f V(\omega)}{\omega}\left[F_0 H_0^{(1)}(k_f r) + 2\sum_{n=1}^N i^n(F_n \cos n\theta + F'_n \sin n\theta)H_n^{(1)}(k_f r)\right]$$

$$\phi' = \frac{i\alpha' V(\omega)}{\omega}\left[G_0 J_0(k'_L r) + 2\sum_{n=1}^N i^n(G_n \cos n\theta + G'_n \sin n\theta)J_n(k'_L r)\right] \quad (51)$$

$$\zeta' = \frac{\beta'^2 V(\omega)}{\omega^2}\left[L_0 J_0(k'_S r) + 2\sum_{n=1}^N i^n(L_n \cos n\theta + L'_n \sin n\theta)J_n(k'_S r)\right] \quad (52)$$

$$\psi' = \frac{i\beta'^2 V(\omega)}{\omega}\left[-N'_0 J_0(k'_S r) + 2\sum_{n=1}^N i^n(N_n \sin n\theta + N'_n \cos n\theta)J_n(k'_S r)\right] \quad (53)$$

where:
  $\phi'$ is scalar potential of the P-wave;
  $\alpha'$ is P-velocity for the metal cylinder;
  $k'_L$ is the radial wavenumber of the P-wave for the metal cylinder, which can be expressed as $k'_L{}^2 = (\omega/\alpha')^2 - k_z^2$;
  $\zeta'$ is scalar potential of the SV-wave;
  $\beta'$ is S-velocity for the metal cylinder;
  $k'_S$ is the radial wavenumber of the S-wave for the metal cylinder, which can be expressed as $k'_S{}^2 = (\omega/\beta')^2 - k_z^2$;
  $\psi'$ is scalar potential of the SH-wave; and
  $F_0$, $F_n$, $F_n'$, $G_0$, $G_n$, $G_n'$, $L_0$, $L_n$, $L_n'$, $N_0'$, $N_n$, and $N_n'$, are unknown coefficients determined by solving the boundary conditions.

The equations of boundary conditions may be constructed for each N as set forth below in Equation (54).

$$-\begin{pmatrix} v_r^{Fl} \\ -p^{Fl} \\ 0 \\ 0 \\ v_r^{Fl'} \\ -p^{Fl'} \\ 0 \\ 0 \end{pmatrix} + \begin{pmatrix} v_r^{Sc} \\ \tau_{rr}^{Sc} \\ \tau_{rz}^{Sc} \\ \tau_{r\theta}^{Sc} \\ v_r^{Cy} \\ \tau_{rr}^{Cy} \\ \tau_{rz}^{Cy} \\ \tau_{r\theta}^{Cy} \end{pmatrix} = -\begin{pmatrix} v_r^{Pl} \\ \tau_{rr}^{Pl} \\ \tau_{rz}^{Pl} \\ \tau_{r\theta}^{Pl} \\ 0 \\ 0 \\ 0 \\ 0 \end{pmatrix} \quad (54)$$

where the superscripts Fl' and Cy correspond to "fluid at the cylinder interface" and "cylinder at the cylinder interface," respectively, the cylinder being the housing 308 of the acoustic tool 300.

The equations of boundary conditions may then be reduced as set forth below in Equation (55).

$$\begin{pmatrix} Q_n & R_n & M_n & 0 \\ Q'_n & R'_n & 0 & M'_n \end{pmatrix} A'_n = -\begin{pmatrix} E_n \\ 0 \end{pmatrix} \quad (55)$$

where $Q_n'$, $R_n$, $R_n'$ and are 4×1 sub-matrices, the elements of which may be as set forth below in Equations (56)-(67).

$$q'_1 = -\frac{i}{\Omega_f}[nJ_n(K'_f) - K'_f J_{n+1}(K'_f)] \quad (56)$$

$$q'_2 = -\frac{\rho_f \alpha_f}{\rho'\beta'} J_n(K'_f) \quad (57)$$

$$q'_3 = 0 \quad (58)$$

$$q'_4 = 0 \quad (59)$$

$$r_1 = -\frac{i}{\Omega_f}[nH_n^{(1)}(K_f) - K_f H_{n+1}^{(1)}(K_f)] \quad (60)$$

$$r_2 = -\frac{\rho_f \alpha_f}{\rho\beta} H_n^{(1)}(K_f) \quad (61)$$

$$r_3 = 0 \quad (62)$$

$$r_4 = 0 \quad (63)$$

$$r'_1 = -\frac{i}{\Omega_f}[nH_n^{(1)}(K'_f) - K'_f H_{n+1}^{(1)}(K'_f)] \quad (64)$$

$$r'_2 = -\frac{\rho_f \alpha_f}{\rho'\beta'} H_n^{(1)}(K'_f) \quad (65)$$

$$r'_3 = 0 \quad (66)$$

$$r'_4 = 0 \quad (67)$$

where $K'_f = k_f r'_b$.

$M_n'$ is a 4×3 sub-matrix of the same form as $M_n$. The elements of $M_n'$ may be as set forth below in Equations (68)-(79).

$$m'_{11} = -\frac{i}{\Omega'_L}[nJ_n(K'_L) - K'_L J_{n+1}(K'_L)] \quad (68)$$

$$m'_{21} = -\frac{i}{\Omega'_S \Omega'_L}[(-2n^2 + 2n + \Omega'_S{}^2 - 2K'_S{}^2)J_n(K'_L) - 2K'_L J_{n+1}(K'_L)] \quad (69)$$

-continued $$m'_{31} = \frac{2iK'_z}{\Omega'_S\Omega'_L}[nJ_n(K'_L) - K'_L J_{n+1}(K'_L)] \quad (70)$$

$$m'_{41} = \frac{2n}{\Omega'_S\Omega'_L}[(n-1)J_n(K'_L) - K'_L J_{n+1}(K'_L)] \quad (71)$$

$$m'_{12} = -\frac{iK'_z}{\Omega'^2_S}[nJ_n(K'_S) - K'_S J_{n+1}(K'_S)] \quad (72)$$

$$m'_{22} = -\frac{2K'_z}{\Omega'^3_S}[-(n^2 - n - K'^2_S)J_n(K'_S) - K'_S J_{n+1}(K'_S)] \quad (73)$$

$$m'_{32} = -\frac{i(K'^2_S - K'^2_z)}{\Omega'^3_S}[nJ_n(K'_S) - K'_S J_{n+1}(K'_S)] \quad (74)$$

$$m'_{42} = \frac{2nK'_z}{\Omega'^3_S}[(n-1)J_n(K'_S) - K'_S J_{n+1}(K'_S)] \quad (75)$$

$$m'_{13} = \frac{in}{\Omega'_S}J_n(K'_S) \quad (76)$$

$$m'_{23} = -\frac{2n}{\Omega'^3_S}[(n-1)J_n(K'_S) - K'_S J_{n+1}(K'_S)] \quad (77)$$

$$m'_{33} = -\frac{inK'_z}{\Omega'^2_S}J_n(K'_S) \quad (78)$$

$$m'_{43} = \frac{1}{\Omega'^2_S}[-(2n^2 - 2n - K'^2_S)J_n(K'_S) - 2K'_S J_{n+1}(K'_S)] \quad (79)$$

where:
$\Omega'_L = \omega r'_b/\alpha'$;
$K'_L = k'_L r'_b$;
$\Omega'_S = \omega r'_b/\beta'$;
$K'_S = k'_S r'_b$; and
$K'_z = k_z r'_b$.

The differences of $M_n'$ from $M_n$ that are unprimed parameters are replaced with primed parameters, and the Hankel functions are replaced with the Bessel function.

$A_n'$ is the column vector of coefficients, such as may be as set forth below in Equation (80).

$$A'_n = (A_n, F_n, B_n, C_n, D_n, G_n, L_n, N_n)^T \quad (80)$$

where elements are primed for the incident SH-plane waves.

The solutions at discrete frequencies are converted to the synthetic waveforms using FFT.

Figure 8:
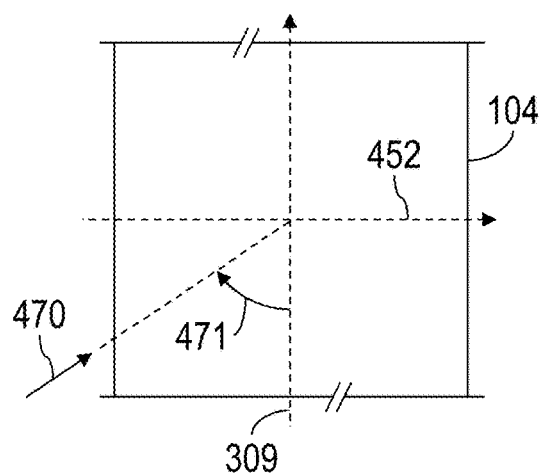
FIGS. 8 and 9 are schematic views demonstrating one or more aspects of the present disclosure.
Figure 9:
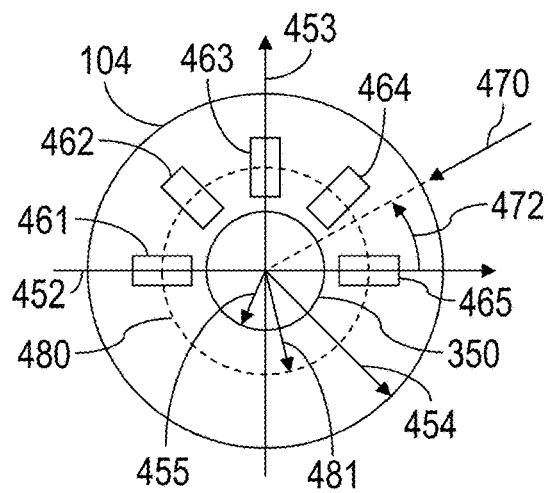

FIGS. 8 and 9 are schematic side and top views, respectively, showing the relations between a plane wave 470, the wellbore 104, the metal cylinder 350, and an implementation of five azimuthally spaced receivers 336. In FIG. 8, the x-axis 452 is perpendicular to the wellbore axis 309, while FIG. 9 shows the y-axis 453 perpendicular to the x-axis 452. The receivers 336 are designated in FIG. 9 by reference numbers 461-465, and are azimuthally spaced along a common radius $r_h$, as indicated in FIG. 9 by a dashed-line circle 480 having radius 481. Reference number 471 in FIG. 8 depicts the inclination δ of the incoming incident wave 470, and reference number 472 in FIG. 9 depicts the azimuth θ of the incoming incident wave 470. Reference number 454 indicates the radius a of the wellbore 104, and reference number 455 indicates the radius $r'_b$ of the metal cylinder 350.

The time-domain response to the plane wave is obtained by computing the responses at discrete frequencies and applying FFT. For example, the time-domain pressure response to the incident plane wave may be expressed as set forth below in Equation (81).

$$p(r, \theta, z, t) = \frac{1}{2\pi^2}\text{Re}\left\{\int_0^\infty \int_{-\infty}^\infty [i\omega\rho_f V(\omega)\delta(k_z - k'_z)\phi_f(k_z, \omega, r, \theta)] \right. \quad (81)$$
$$\left. e^{i(k_z z - \omega t)}dk_z d\omega\right\}$$
$$= \frac{1}{2\pi^2}\text{Re}\left\{\int_0^\infty [i\omega\rho_f V(\omega)\phi_f(k'_z, \omega, r, \theta)]e^{i(k_z z - \omega t)}d\omega\right\}$$

where:
Re is the operator for taking the real part of a complex number;
$\delta(k_z - k'_z)$ is the delta function representing the plane wave;
$k'_z = \omega \cos \delta/\alpha$ for the P-wave; and
$k'_z = \omega \cos \delta/\beta$ for the S-wave.
Setting z=0 results in Equation (82) set forth below.

$$p(r, \theta, t) = \frac{1}{2\pi^2}\text{Re}\left\{\int_0^\infty [i\omega\rho_f V(\omega)\phi_f(k'_z, \omega, r, \theta)]e^{-i\omega(t-T_0)}d\omega\right\} \quad (82)$$

where $T_0$ is the signal arrival time at r=0. The integrand is determined for ω by the interval of Δω, such as with the parameters set forth below in Equations (83)-(85).

$$\Delta t = \frac{t_c}{20} \quad (83)$$

$$N_s = \frac{30t_c}{\Delta t} + 1 \quad (84)$$

$$\Delta\omega = \frac{\pi}{\Delta t\lfloor N_s/2\rfloor} \quad (85)$$

where:
$t_c$ is the dominant time period, and is equal to the inverse of the central frequency $f_c$;
$\Delta t$ is the sampling period;
$N_s$ is the number of samples; and
$\lfloor \cdot \rfloor$ indicates the floor function.
The real ω may be utilized, such as when there is no singularity in the numerical computations.

Figure 10:
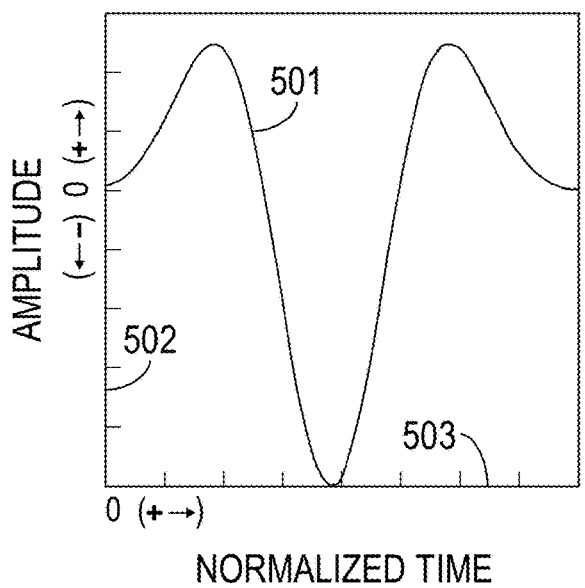
FIGS. 10-17 are graphs demonstrating one or more aspects of the present disclosure.
Figure 11:
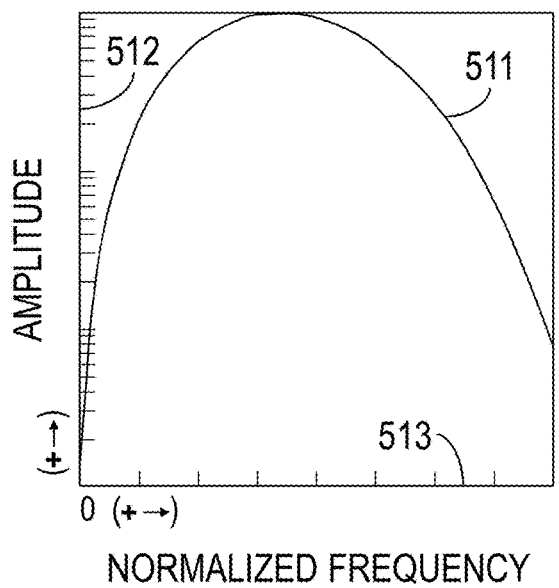

The Blackman-Harris wavelet may be used for the waveforms of the incident plane waves. FIG. 10 shows an example time response 501 of the Blackman-Harris wavelet, with a linear amplitude axis 502 and a linear time axis 503, and where the time is normalized by the dominant period. FIG. 11 shows an example frequency response 511 of the Blackman-Harris wavelet, with a logarithmic amplitude axis 512 and a linear frequency axis 513, and where the frequency is normalized by the central frequency. In the following examples, the central frequencies of wavelets are selected from those of monopole and dipole sources of an implementation of the acoustic tool 300 described above, the incident P- and SV-waves are considered for the monopole source, the incident SH-wave is considered for the dipole source, the first receiver 461 is oriented to the plane wave, the fifth receiver 465 is oriented opposite the direction of the plane wave, and the third receiver 463 is oriented orthogonal to the plane wave.

Figure 12:
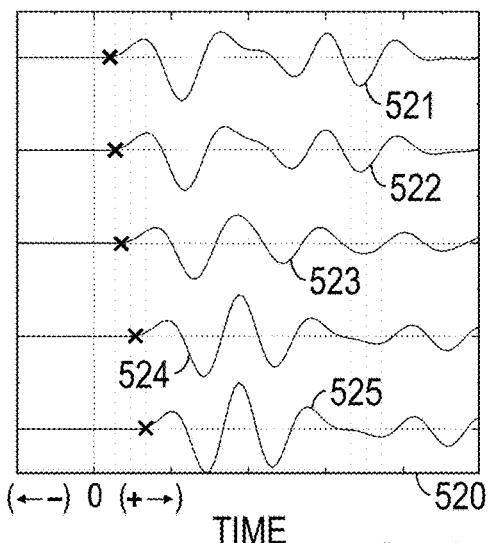
Figure 13:
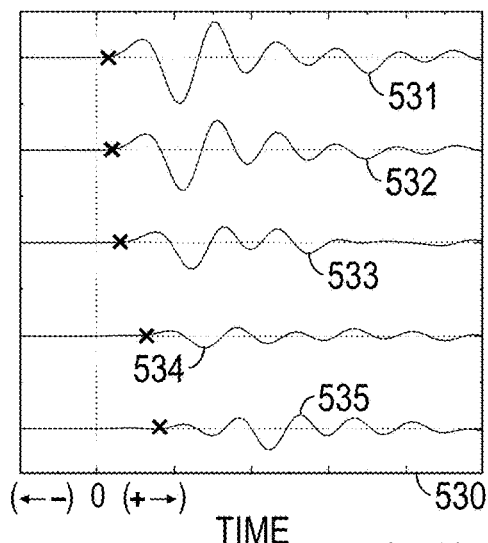

FIG. 12 shows example synthetic waveforms 521-525, corresponding to respective receivers 461-465, for the incident P-plane waves without the acoustic tool in the wellbore. FIG. 13 shows example synthetic waveforms 531-535, corresponding to respective receivers 461-465, for the incident P-plane waves with the acoustic tool in the wellbore. In FIGS. 12 and 13, the central frequency of the plane wave is 8 kHz, and the horizontal axes 520 and 530 show the recording time. The waveforms 521-525 and 531-535 are shifted so that $T_0$=0, and the amplitudes are normalized by the maximum peak amplitude of each respective waveform. The arrival times (each marked by an "X") exhibit apparent differences in both figures. Moreover, the amplitude variations among the receivers 461-465 are substantial in FIG. 13 due to the existence of the acoustic tool in the wellbore.

Figure 14:
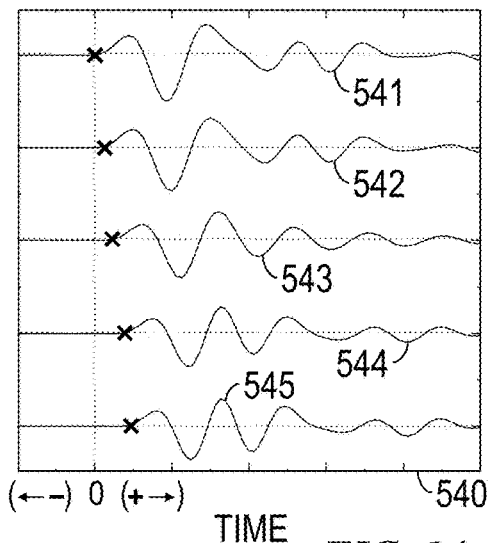
Figure 15:
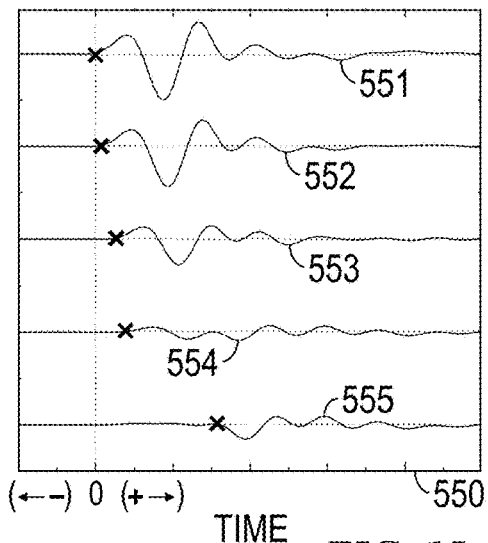

FIG. 14 shows example synthetic waveforms 541-545, corresponding to respective receivers 461-465, for the incident SV-plane waves without the acoustic tool in the wellbore. FIG. 15 shows example synthetic waveforms 551-555, corresponding to respective receivers 461-465, for the incident SV-plane waves with the acoustic tool in the wellbore. In FIGS. 14 and 15, the central frequency of the plane wave is 8 kHz, and the horizontal axes 540 and 550 show the recording time. The waveforms 541-545 and 551-555 are shifted so that $T_0$=0, and the amplitudes are normalized by the maximum amplitude of each respective waveform. The arrival times (each marked by an "X") exhibit apparent differences in both figures. Moreover, the amplitude variations among the receivers 461-465 are substantial in FIG. 15 due to the existence of the acoustic tool in the wellbore.

Figure 16:
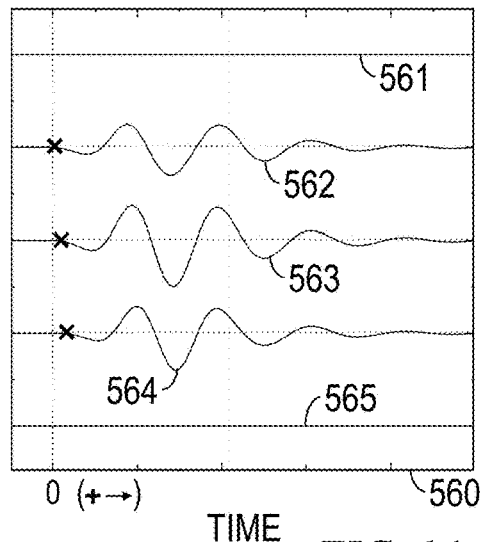
Figure 17:
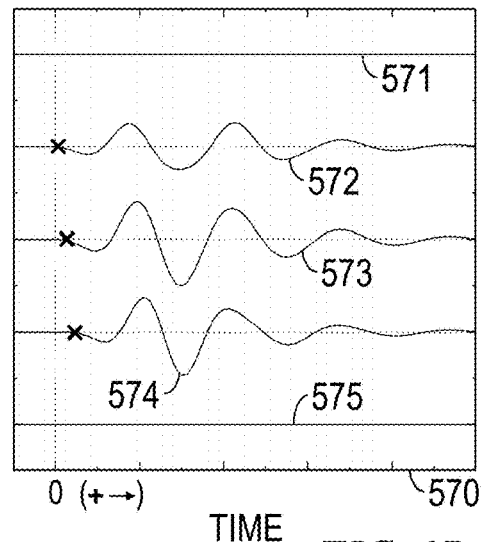

FIG. 16 shows example synthetic waveforms 561-565, corresponding to respective receivers 461-465, for the incident SH-plane waves without the acoustic tool in the wellbore. FIG. 17 shows example synthetic waveforms 561-565, corresponding to respective receivers 461-465, for the incident SH-plane waves with the acoustic tool in the wellbore. In FIGS. 16 and 17, the central frequency of the plane wave is 4 kHz, and the horizontal axes 560 and 570 show the recording time. The waveforms 561-565 and 571-575 are shifted so that $T_0$=0, and the amplitudes are normalized by the maximum amplitude of each respective waveform. The signals 561 and 571 of the receiver 461 are zero, as are the signals 565 and 575 of the receiver 465. The arrival times (each marked by an "X") exhibit small differences in FIG. 17, while such differences are hardly noticeable in FIG. 16. Again, the amplitude variations among the receivers 461-465 are substantial in FIG. 17 due to the existence of the acoustic tool in the wellbore.

Table 1 set forth below shows the ratios of maximum amplitude of the receivers 461-465 for the example computations described above.

TABLE 1

Ratios of Maximum Amplitudes for Azimuthally Distributed Receivers

| Plane Wave | Model | $f_c$ (kHz) | Receiver 461 | Receiver 462 | Receiver 463 | Receiver 464 | Receiver 465 |
|---|---|---|---|---|---|---|---|
| P | Without tool | 8 | 0.93 | 0.87 | 0.78 | 0.88 | 1.0 |
| P | With tool | 8 | 1.0 | 0.87 | 0.56 | 0.25 | 0.46 |
| SV | Without tool | 8 | 1.0 | 0.93 | 0.79 | 0.71 | 0.72 |
| SV | With tool | 8 | 1.0 | 0.87 | 0.56 | 0.17 | 0.31 |
| SH | Without tool | 4 | 0.0 | 0.61 | 1.0 | 0.80 | 0.0 |
| SH | With tool | 4 | 0.0 | 0.52 | 1.0 | 0.94 | 0.0 |

By using the model with the tool, the amplitude variations are emphasized. For the incident P- and SV-plane waves, the receivers showing the maximum amplitude are oriented to the plane waves for the model with the tool. For the incident SH-plane waves, the maximum amplitude is given for the receiver oriented to the orthogonal direction of the plane wave. For the other receivers having signals, the receiver oriented to the plane wave shows lower amplitude than the oppositely oriented receiver.

This example demonstrates that the azimuthal direction of a reflector can be determined by comparing the amplitudes of waveforms of the azimuthally distributed receivers. For P- and SV-waves, the receiver that provides the maximum amplitude is oriented closest to the direction of the reflector, relative to the other receivers. Therefore, for the P- and SV-waves, by selecting the three largest adjacent amplitudes among the azimuthally distributed receivers, the azimuth of the incident wave between the azimuthal positions of the receivers can be determined by fitting the amplitudes of those receivers to a quadratic or other function. However, such approach can result in a 180-degree ambiguity. On the other hand, for SH-waves, the receiver that provides the maximum amplitude is oriented closest to orthogonal to the direction of the reflector, relative to the other receivers. Thus, by comparing SH-wave amplitudes from the receivers adjacent the receiver having the largest amplitude for SH-waves, the 180-degree ambiguity can be resolved.

The apparent amplitude differences of the azimuthally distributed receivers may permit robust estimates of the azimuthal directions of reflectors, relative to the differences of arrival times, especially for signals with low signal-to-noise ratio. Moreover, as demonstrated by the examples depicted in FIGS. 12-17, the conventional assumption that the acoustic wave in the wellbore is simply a plane wave is not valid, and the differences of waveforms at the azimuthally distributed receivers are not negligible when the wellbore contains the metal cylinder 350 of the acoustic tool 300.

Furthermore, the signal-to-noise ratio of BARS waveforms can be very low, and the event signals recorded by the azimuthally distributed receivers that are not oriented to the incoming signals may not be observed. Therefore, existing methods for identifying the reflector direction based on event signals at each receiver may not be accurate, and identification methods according to one or more aspects described above may provide greater accuracy.

The following description introduces one or more aspects that may be utilized to determine to identify incoming wave directions for an implementation of the acoustic tool 300 utilized in a wellbore 104 as described above. The incoming wave direction is approximately the same with the direction (or strike) of the reflector when the signals are observed by a reflection survey such as BARS. However, one or more aspects described below may also be applicable or readily adaptable for use with multi-well surveys in which the acoustic tool records event signals transmitted from other wells.

As described above, responses of the azimuthally distributed receivers are different for the incident P-, SV-, and SH-waves. That is, where incident P- and SV-waves are observed for a monopole source, the receiver at the azimuthal position closest to the incoming wave direction observes the maximum signal amplitude (whether such amplitude is the measured, normalized, and/or root-mean-square ("RMS") amplitude). However, where incident SV- and SH-waves are observed for a dipole source, the receiver at the azimuthal position closest to the incoming wave direction observes the maximum amplitude for the SV-waves, just as with the monopole source, but the receiver at the azimuthal position closest to orthogonal to the incoming wave direction observes the maximum amplitude for the SH-waves.

The maximum signal amplitude $\overline{W_k}$ at each receiver may be as expressed below in Equation (86).

$$\overline{W_k} = \max_{0<t<T} |W_k(t_0+t)| \tag{86}$$

where:
$W_k(t)$ is the waveform of the $k^{th}$ azimuthal location of the receiver;
$t_0$ is the arrival time of the event signal at the receiver; and
T is the length of the event signal.

However, the event signal arrival time to at the earliest-receiving receiver may be earlier than the arrival time at another receiver, in which case T is assumed to be longer than the length of the event signal at that receiver, and an average or median $W_k$ of may be used for each receiver.

The event signal RMS amplitude may be determined as set forth below in Equation (87).

$$\overline{W_k} = \sqrt{\frac{1}{T}\int_0^T W_k^2(t_0+t)dt} \tag{87}$$

The maximum event amplitude for the migration image, $A_I$, may be determined as set forth below in Equation (88).

$$A_I = \max_{0<r<R, 0<z<Z} |I(r_0+r, z_0+z)| \tag{88}$$

where:
I(r,z) is the two-dimensional ("2D") image in the directions of the distance from the longitudinal axis of the wellbore and the depth positions;
$r_0$ is the reference point of the distance from the longitudinal axis of the wellbore;
$z_0$ is the reference point of the distance from the depth point;
R and Z are intervals; and
$r_0$, $z_0$, R, and Z are selected so that the event in the image is included for estimation.

The RMS amplitude of the event in the migration image, $RMS_I$, may be determined as set forth below in Equation (89).

$$RMS_I = \sqrt{\frac{1}{RZ}\int_0^R \int_0^Z I^2(r_0+r, z_0+z)dzdr} \tag{89}$$

One or more aspects described herein are applicable for both the waveforms and the migration images for the individual azimuthally distributed receivers. However, for ease of explanation, the following description is generally explained in the context of using the waveforms, with the understanding that one or more of the aspects described below are also applicable or readily adaptable for using the migration images.

Identification of Incoming Wave Direction from P- and SV-Waves

The P- and SV-waves may be observed for a monopole source, along with the apparent amplitude differences at the azimuthally distributed receivers for the associated incoming wave. Because the receiver more closely oriented to the incoming wave direction observes the largest signal amplitude, the azimuthal location of the reflector (between the azimuthal locations of the receivers) may be determined by fitting the signal amplitudes to one or more predetermined functions, such as the quadratic functions set forth below in Equations (90)-(92).

$$u_{-1}=a(-\Delta\theta-c)^2+b \tag{90}$$

$$u_0=a(-c)^2+b \tag{91}$$

$$u_1=a(\Delta\theta-c)^2+b \tag{92}$$

where:
$\Delta\theta$ is the azimuthal spacing interval between the receivers;
$u_0$ is the amplitude of the receiver observing the maximum amplitude at $\theta_0$;
$u_{-1}$ is the signal amplitude at $\theta_0-\Delta\theta$;
$u_1$ is the signal amplitude at $\theta_0+\Delta\theta$; and
a, b, and c are parameters given by solving Equations (90)-(92).

By solving Equations (90)-(92), the azimuthal location of the reflector ($\theta_{RFL}$) may be determined as set forth below in Equation (93).

$$\theta_{RFL}=\theta_0+c \tag{93}$$

Here, as described above, the amplitudes of the migration images for each receiver may also be used.

Identification of Incoming Wave Direction of S-wave

The waveforms for each receiver may be denoted by W ($\theta$, t), where $\theta$ is the azimuthal position of the receiver and t is the recording time. The stacked waveforms $\overline{W}(\theta, t)$ may be determined as set forth in Equations (94) and (95).

$$\overline{W}(\theta_{i-1/2}, t) = \sum_{j=1}^{N/2} [W((i+j-1)\Delta\theta, t) - W((i-j)\Delta\theta, t)] \tag{94}$$

for $\theta_{i-1/2} = i\Delta\theta - \frac{\Delta\theta}{2}$, and $$\overline{W}(\theta_i, t) = \sum_{j=1}^{\frac{N}{2}-1} [W((i+j)\Delta\theta, t) - W((i-j)\Delta\theta, t)] \tag{95}$$

for $\theta_i = i\Delta\theta$, where:
$\overline{W}(\theta_{i-1/2}, t)$ and $\overline{W}(\theta_i, t)$ are the stacked waveforms; and
$\theta_{i-1/2}$ and $\theta_i$ are the azimuthal directions.

Figure 18:
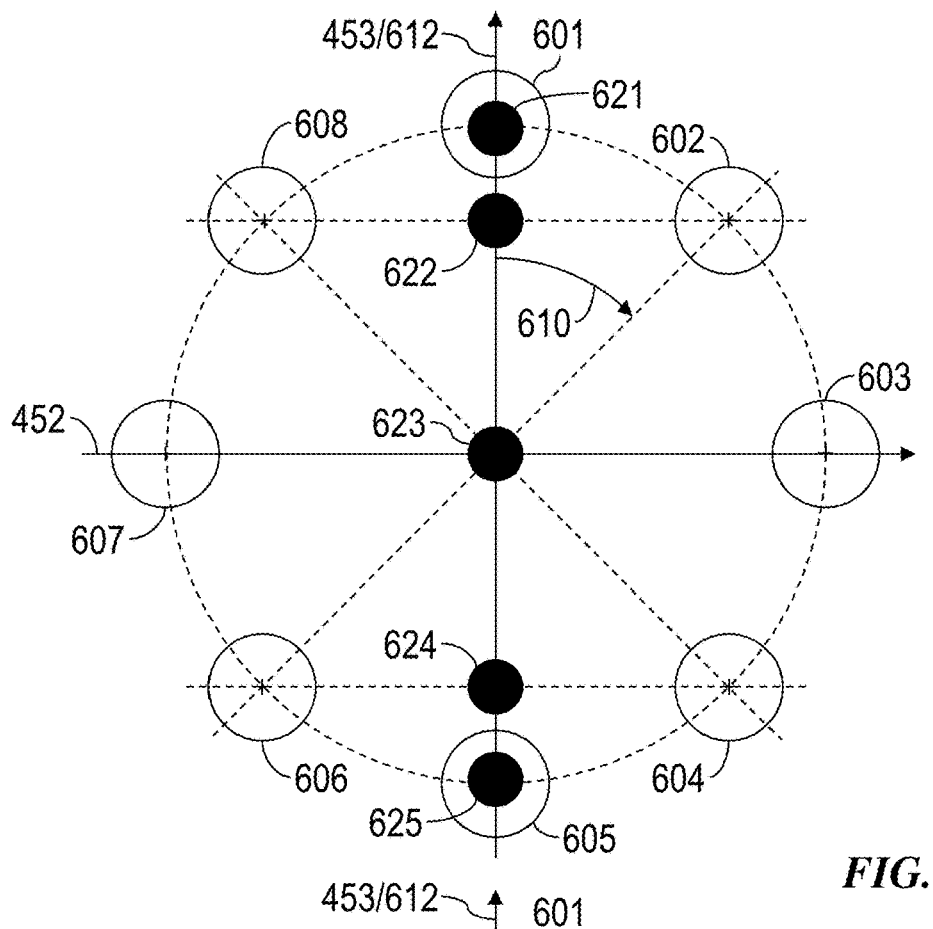
FIGS. 18-20 are schematic views demonstrating one or more aspects of the present disclosure.
Figure 19:
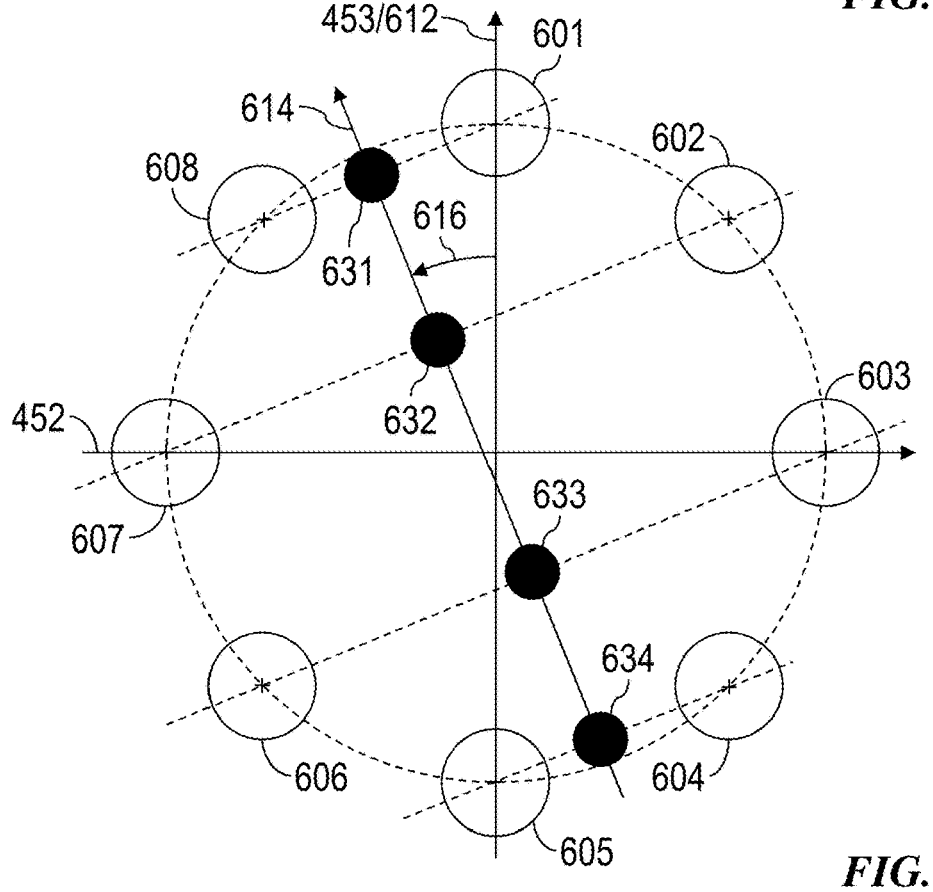

FIGS. 18 and 19 show example receivers 601-608 and the azimuthal directions for the stacked waveforms, in which the azimuthal position $\theta$ of each receiver is measured clockwise (610) from $\theta_0$ (612), which is coincident with the positive portion of the y-axis 453. The azimuth $\theta_{-1/2}$ (614) is rotated counterclockwise (616) from $\theta_0$ (612) by $\theta_{-1/2}$. The incoming wave direction can be identified by finding the maximum amplitudes of $\overline{W}(\theta_{i-1/2}, t)$ and $\overline{W}(\theta_i, t)$. The azimuthal location of the receiver with the maximum amplitude can also be found be comparing the migration images for $\overline{W}(\theta_{i-1/2}, t)$ and $\overline{W}(\theta_i, t)$. The optimum migration image may be obtained by processing the stacked waveforms for the identified receiver.

After identifying the incoming wave direction, summed waveforms on the selected receiver may be determined as set forth below in Equations (96) and (97) set forth below.

$$\overline{W}_j(\theta_{i31\ 1/2},t)=W((i+j-1)\Delta\theta,t)-W((i-j)\Delta\theta,t) \quad (96)$$

for $j=1, \ldots, N/2$, and $$\overline{W}_j(\theta_i,t)=W((i+j)\Delta\theta,t)-W((i-j)\Delta\theta,t) \quad (97)$$

for $j=0, \ldots, N/2$.

FIGS. 18 and 19 also show example positions where the summed waveforms are defined. FIG. 18 depicts the case of $\theta_0$ (612) being selected, resulting in the example summed waveforms 621-625 set forth below in Equations (98)-(102).

Summed waveform 621: $\overline{W}_0(\theta_i,t)=2W((i)\Delta\theta,t)$ (98)

Summed waveform 622:
$\overline{W}_1(\theta_i,t)=W((i+1)\Delta\theta,t)+W((i-1)\Delta\theta,t)$ (99)

Summed waveform 623:
$\overline{W}_2(\theta_i,t)=W((i+2)\Delta\theta,t)+W((i-2)\Delta\theta,t)$ (100)

Summed waveform 624:
$\overline{W}_3(\theta_i,t)=W((i+3)\Delta\theta,t)+W((i-3)\Delta\theta,t)$ (101)

Summed waveform 625: $\overline{W}_4(\theta_i,t)=2W((i+4)\Delta\theta,t)$ (102)

Thus, for i=1, corresponding to receiver 601, summed waveform 621 is zero, summed waveform 622 is the difference between the waveforms corresponding to receivers 602 and 608, summed waveform 623 is the difference between the waveforms corresponding to receivers 603 and 607, summed waveform 624 is the difference between the waveforms corresponding to receivers 604 and 606, and summed waveform 625 is zero.

Figure 20:
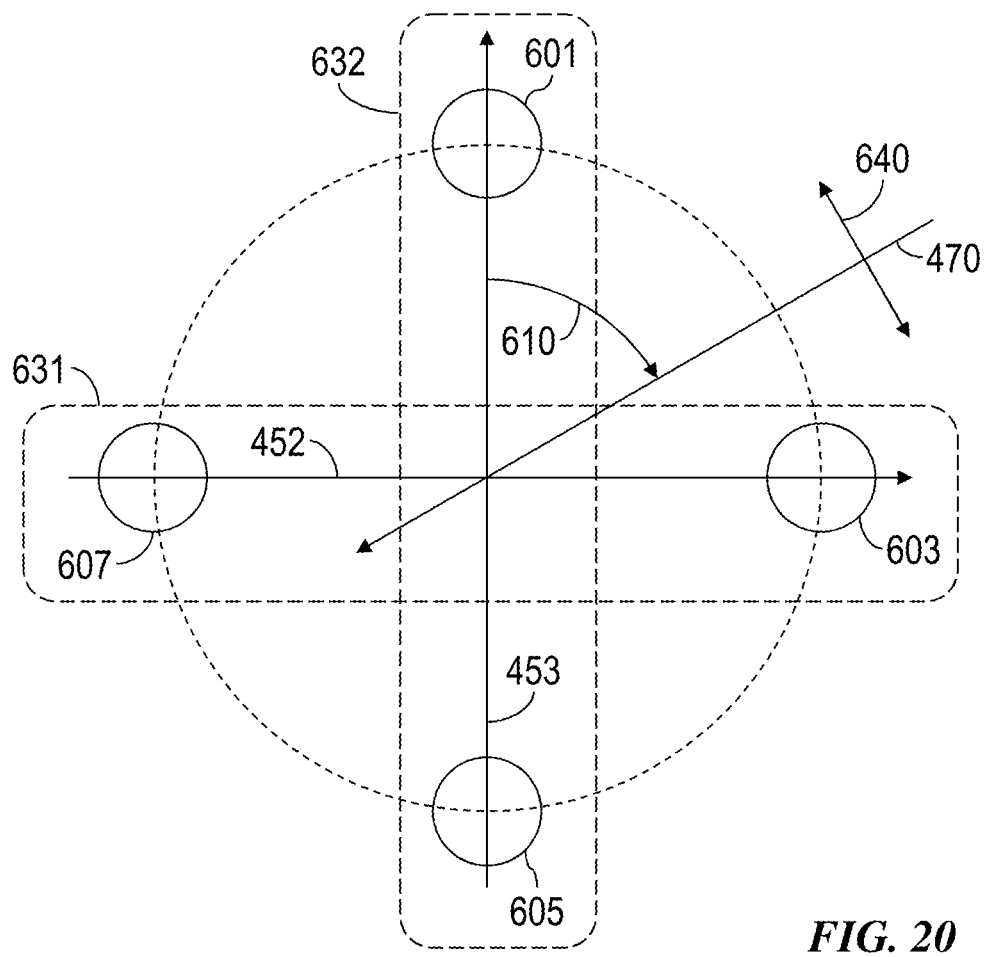

FIG. 20 depicts the case of $\theta_{-1/2}$ (614) being selected, resulting in the example summed waveforms 631-634 set forth below in Equations (103)-(106).

Summed waveform 631:
$\overline{W}_1(\theta_{i-1/2},t)=W((i)\Delta\theta,t)+W((i-1)\Delta\theta,t)$ (103)

Summed waveform 632:
$\overline{W}_2(\theta_{i-1/2},t)=W((i+1)\Delta\theta,t)+W((i-2)\Delta\theta,t)$ (104)

Summed waveform 633:
$\overline{W}_3(\theta_{i-1/2},t)=W((i+2)\Delta\theta,t)+W((i-3)\Delta\theta,t)$ (105)

Summed waveform 634:
$\overline{W}_4(\theta_{i-1/2},t)=W((i+3)\Delta\theta,t)+W((i-4)\Delta\theta,t)$ (106)

Thus, for i=1, corresponding to receiver 601, summed waveform 631 is the difference between the waveforms corresponding to receivers 601 and 608, summed waveform 632 is the difference between the waveforms corresponding to receivers 602 and 607, summed waveform 633 is the difference between the waveforms corresponding to receivers 603 and 606, and summed waveform 634 is the difference between the waveforms corresponding to receivers 604 and 605.

By examining the amplitudes on the axis, the larger amplitude direction is determined to be the dip direction, thus resolving the 180-degree ambiguity.

A simplified version of the above may estimate the incoming wave direction using Equation (107) set forth below.

$$\overline{W}(\theta_i, t) = W\left(\left(i+\frac{N}{4}\right)\Delta\theta, t\right) - W\left(\left(i-\frac{N}{4}\right)\Delta\theta, t\right) \quad (107)$$

Also, in the process described above, $W(\theta, t)$ and $\overline{W}(\theta, t)$ can be replaced by the migration image for the individual receivers. That is, when the x- and y-dipole sources are used, $W(\theta, t)$ can be replaced by Equations (108) and (109) set forth below.

$$W^+(\theta,t)=W_x(\theta,t)+W_y(\theta,t) \quad (108)$$

$$W^-(\theta,t)=W_x(\theta,t)-W_y(\theta,t) \quad (109)$$

where $W_x(\theta, t)$ and $W_y(\theta, t)$ are the x- and y-dipole signals, respectively. Then, $W^+(\theta, t)$ or $W^-(\theta, t)$ may be selected by finding the larger amplitude signals.

Identification of Incoming Shear Wave Direction Using Dipole Receivers

FIG. 20 is an example schematic corresponding to the following description pertaining to aspects of identifying incoming shear wave direction using dipole receivers. A first dipole receiver ("x-dipole receiver") 631 comprises receivers 603 and 607 on the x-axis 452, and a second dipole receiver ("y-dipole receiver") 632 comprises receivers 601 and 605 on the y-axis 453. As with the other examples described above, azimuth θ is measured clockwise (610) from the positive portion of the y-axis 453. FIG. 20 also depicts an incident wave 470 and the particle displacement vector 640 of the associated SH-wave.

The sensitivity of a dipole receiver is relatively high for SH-components 640, and relatively low for SV-components (not shown in FIG. 20). Thus, just the SH-components 640 may be considered for the incident S-waves. The incident S-wave signals observed by the dipole receivers 631 and 632 may be expressed as set forth below in Equations (110) and (111).

$$x(t)=SH(t)\cos\theta \quad (110)$$

$$y(t)=-SH(t)\sin\theta \quad (111)$$

where:
x(t) are the signals observed by the x-dipole receiver 631;
y(t) are the signals observed by the y-dipole receiver 632;
SH(t) are the amplitudes of SH-components 640; and
θ is the azimuth of the incoming wave direction.

The maximum signal amplitudes may be expressed as set forth below in Equations (112) and (113).

$$A_x = \max_{0<t<T} |x(t_0 + t)| \quad (112)$$

$$A_y = \max_{0<t<T} |y(t_0 + t)| \quad (113)$$

Thus, the azimuth containing 90-degree ambiguity may be determined as set forth below in Equation (114).

$$\theta' = \tan^{-1}\left(\frac{A_y}{A_x}\right) \quad (114)$$

where θ' is the azimuth containing 90- and 180-degree ambiguities. Also, $A_x$ and $A_y$ can be replaced by RMS amplitudes, as described above.

Equations (115) and (116) set forth below may be utilized to remove the 90-degree ambiguity.

$$SH^+ = \max_{0<t<T} |x(t)\cos\theta' - y(t)\sin\theta'| \qquad (115)$$

$$SH^- = \max_{0<t<T} |x(t)\cos\theta' + y(t)\sin\theta'| \qquad (116)$$

If $SH^+>SH^-$, then $\theta=\theta'$, but if $SH^+<SH^-$, then $\theta=-\theta'$. Then, $\theta$ is determined for each receiver, and a median or average may be taken to increase robustness. Also, $SH^+$ and $SH^-$ may be estimated using RMS amplitudes.

The azimuthal direction of the incoming wave 470, which contains a 180-degree ambiguity, may thus be determined. After $\theta$ is determined, the waveforms are projected on the incoming wave direction to determine the optimum image, as set forth below in Equation (117).

$$SH = x(t)\cos\theta - y(t)\sin\theta \qquad (117)$$

As described above, the migration images for arrays of each dipole receiver may be utilized instead of waveforms.

Identification of Incoming Shear Wave Direction Using Multiple Sources

Considering a first set of dipole components x1(t) and y1(t), and a second set of dipole components x2(t) and y2(t), the composed waveforms may be as set forth below in Equations (118)-(121).

$$x^+(t) = x1(t) + x2(t) \qquad (118)$$

$$y^+(t) = y1(t) + y2(t) \qquad (119)$$

$$x^-(t) = x1(t) - x2(t) \qquad (120)$$

$$y^-(t) = y1(t) - y2(t) \qquad (121)$$

The maximum or RMS amplitudes may then be defined for the composed waveforms and denoted by $A_{x+}$, $A_{y+}$, $A_{x-}$, and $A_{y-}$. An amplitude ratio R may then be expressed as set forth below in Equation (122).

$$R = \frac{A_{x+} + A_{y+}}{A_{x-} + A_{y-}} \qquad (122)$$

The process for identifying incoming shear wave direction using multiple sources is the same process as described above for identifying incoming shear wave direction using dipole receivers, except that if the amplitude ratio R>1, then $x^+(t)$ and $y^+(t)$ are selected for x(t) and y(t), otherwise $x^-(t)$ and $y^-(t)$ are selected for x(t) and y(t).

This "multiple source" method is also applicable or readily adaptable to 4-C dipole data. In such implementations, if there are more than two sources, the data is divided into subsets of two sources, and then composed.

As with the other examples described above, the migration images for arrays for each dipole receiver may be used instead of waveforms.

Identification of Incoming Shear Wave Direction Using 4-C Dipole Data

In BARS survey, the radiation of a dipole source and the reception of a dipole receiver are reciprocal for the SH-waves. However, this relation does not hold for the SV-waves. Signal amplitudes of SV-waves are attenuated by the dipole receiver, and they can be omitted in 4-C dipole data. Thus, 4-C dipole data may be expressed using just SH-components as set forth below in Equation (123).

$$\begin{pmatrix} xx & xy \\ yx & yy \end{pmatrix} = \begin{pmatrix} SH\cos^2\theta & -SH\cos\theta\sin\theta \\ -SH\cos\theta\sin\theta & SH\sin^2\theta \end{pmatrix} \qquad (123)$$

where SH is the amplitude of the SH-wave, and $\theta$ is the strike of the reflector. This matrix can be diagonalized using the well known Alford rotation, as set forth below in Equation (124).

$$R(\theta)\begin{pmatrix} xx & xy \\ yx & yy \end{pmatrix}R^T(\theta) = \begin{pmatrix} SH & 0 \\ 0 & 0 \end{pmatrix}, \qquad (124)$$

where $$R(\theta) = \begin{pmatrix} \cos\theta & \sin\theta \\ -\sin\theta & \cos\theta \end{pmatrix}$$

To find $\theta$, various methods may be used to identify the fast and slow axes of formation using the Alford rotation. However, the (1.1) element is maximized, or elements other than the (1.1) element are minimized, instead of minimizing the off-diagonal elements from the form of the diagonal matrix, if a least-squares method is used. The minimization of off-diagonal elements may also cause inaccurate estimates because the (2,2) elements may also be small.

Figure 21:
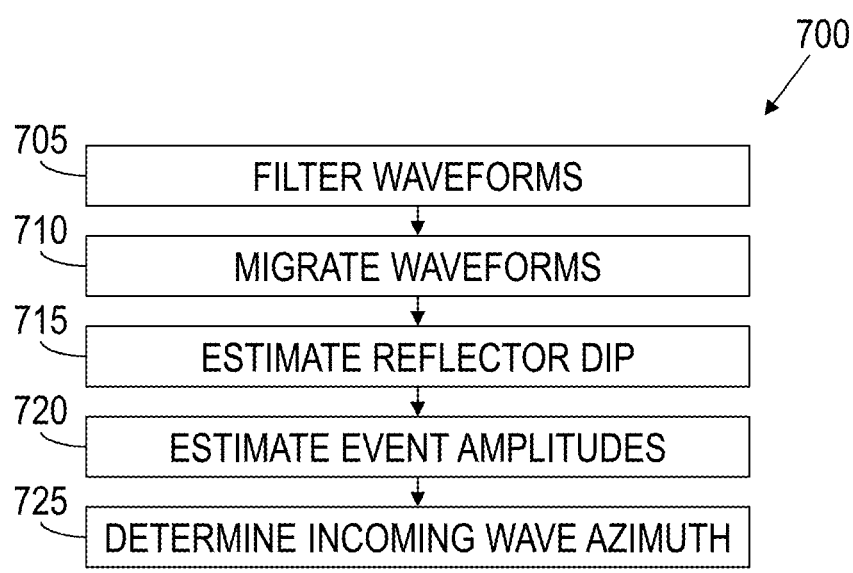
FIG. 21 is a flow-chart diagram of at least a portion of an example implementation of a method according to one or more aspects of the present disclosure.

FIG. 21 is a flow-chart diagram of at least a portion of an example implementation of a method (700) for determining the azimuthal direction of a reflector according to one or more aspects of the present disclosure. The method (700) may be utilized in conjunction with one or more implementations of the apparatus shown in one or more of FIGS. 1-7, and may be performed by one or more instances and/or implementations of the processing system 800 shown in FIG. 23 and described below.

Figure 22:
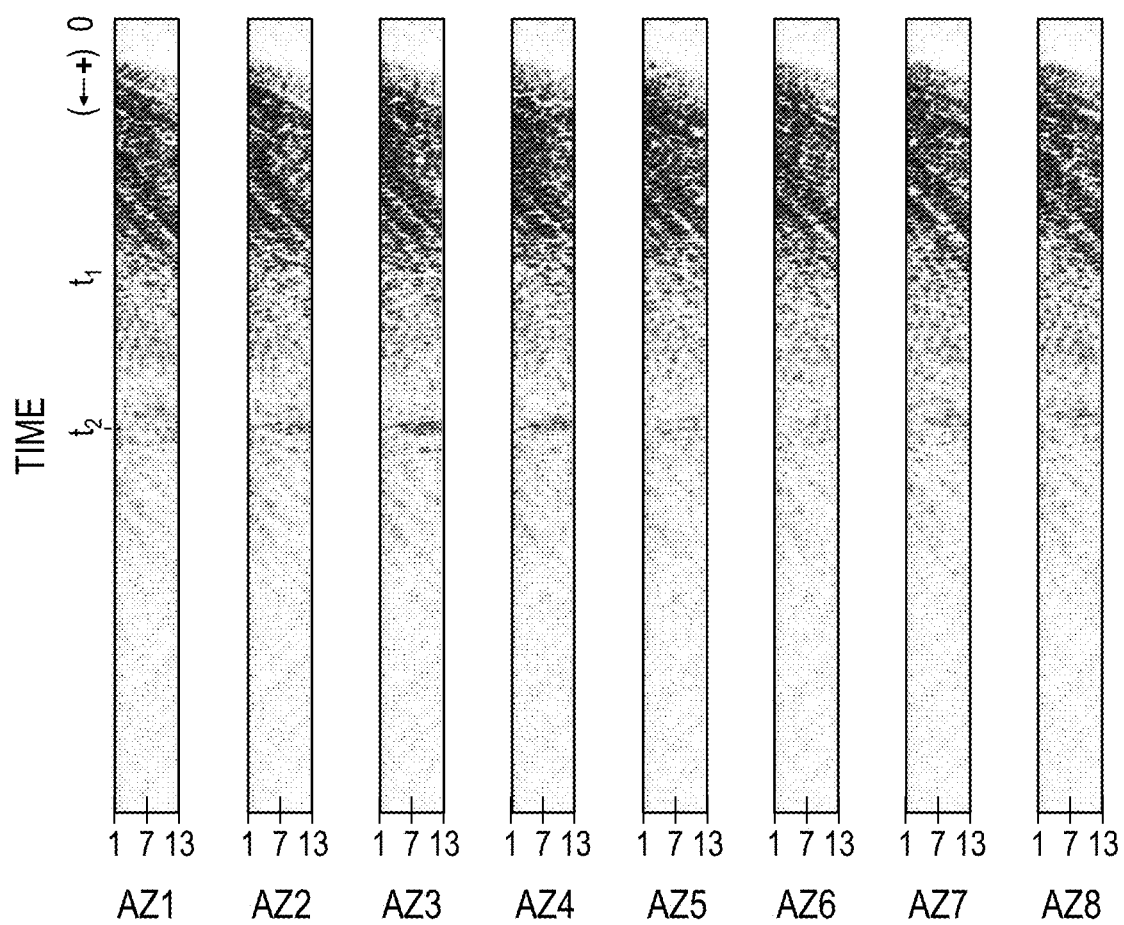
FIG. 22 is a graph demonstrating one or more aspects of the present disclosure.

The method (700) may comprise filtering (705) waveforms obtained via the acoustic tool receivers, such as to remove direct waves and modes, and to extract event signals. Such filtering (705) may be via various known and/or future-developed means. FIG. 22 depicts examples of filtered waveforms recorded by thirteen arrays of receivers utilized to obtain BARS data. The arrays are axially distributed along the longitudinal axis of the acoustic tool, and each array comprises eight receivers azimuthally distributed at azimuthal positions AZ1-AZ8. Each panel in FIG. 22 shows waveforms of each azimuthal array, with the vertical axis showing recording time, and the horizontal axis showing the array index (1-13) of each array. A median filter in the common offset domain was applied to remove direct waves, although a velocity filter and/or other filters may also or instead be used during the filtering (705). The event signals are seen at time $t_2$. The signals are more apparent in the AZ2, AZ3, and AZ4 azimuthal positions, and weaker in the other azimuthal positions. A monopole source with a central frequency of 8 kHz was used, and the signals were identified as the SV-reflected waves from a fracture. The signals before time $t_1$ are residuals of direct waves, and the signals with steeper slopes, after time $t_2$, are Stoneley reflections.

The waveforms may then be migrated (710) for each azimuth. Such migration (710) may be via various known or future-developed means. For example, the migration (710) may assess various distances between the acoustic tool and portions of reflectors to generate continuous reflectors for imaging. For example, where the waveforms indicate distances between reflection points, the migration (710) may determine distances from between the reflection points to the acoustic tool, such as via migration processing that estimates the distances to the reflector between the reflection points based on the measured or calculated distances associated with the points. As the acoustic tool moves within the wellbore to determine distances to (i.e., to image) other portions of the reflectors, the waveform migration (710) may migrates (e.g., interpolate) distances to the reflectors between the measurement locations of the acoustic tool. However, other means for the waveform migration (710) may also or instead be utilized. Nonetheless, the waveform migration (710) generates continuous imaging for portions of the subterranean formation that have been measured. Such imaging may show the shape, depth, boundary, and/or other reflector information that may be determined from the calculated distances.

The migrated (710) waveforms may then be used to estimate (715) dip of the reflector. For example, the dip estimation (715) may include comparing the waveform migration (710) image to a resistivity image, and/or otherwise analyzing the waveform migration (710) image with a resistivity image. The dip estimation (715) may also or instead be determined using surface seismic data. Such "reflection seismology" measurement techniques may occur prior to obtaining measurements with the acoustic tool.

The dip estimation (715) may utilize various known or future-developed modeling techniques. For example, various dip angles may be evaluated to generate synthetic waveforms, perhaps similar to the synthetic waveform generation described above, and the dip angle that provides the best agreement between synthetic and recorded waveforms is selected as the estimated (715) dip angle. The modeling techniques may take into account various known physical principles, such as the law of reflection, Snell's law, the Schoenberg slip model (described in Schoenberg, "Elastic wave behavior across linear slip surfaces," J. Acoust. Soc. Am. 68(5), November 1980, pp. 1516-1521, which is hereby incorporated by reference in its entirety), and/or other examples.

Event amplitudes are estimated (720) from the waveforms and/or migration (710) images. For example, the event signal amplitudes may be estimated (720) utilizing one or more of Equations (86)-(89).

The azimuthal direction of the incoming wave is then determined (725) by identifying the receiver closest to the incoming wave direction, based on the estimated (720) event signal amplitudes, then using the data obtained from that receiver and the azimuthally adjacent receivers. That is, as described above, the azimuthal direction of a reflector can be determined by comparing the amplitudes of waveforms of the azimuthally distributed receivers, because for P- and SV-waves, the receiver that provides the maximum amplitude is oriented closest to the direction of the reflector, and for SH-waves, the receiver that provides the maximum amplitude is oriented closest to orthogonal to the direction of the reflector. Therefore, by selecting the three largest adjacent P- and SV-wave amplitudes from among the azimuthally distributed receivers, fitting those amplitudes, and assessing S-wave amplitudes to resolve 180-degree ambiguity, the azimuth of the incident wave can be determined (725). Identifying the incoming wave direction from the P- and SV-waves may be as described above with respect to Equations (90)-(93). Assessing S-wave amplitudes to resolve the resulting 180-degree ambiguity may utilize azimuthally spaced receivers, as described above with respect to Equations (94)-(109). Assessing S-wave amplitudes to resolve the 180-degree ambiguity may also or instead utilize dipole receivers, as described above with respect to Equations (110)-(117). Assessing S-wave amplitudes to resolve the 180-degree ambiguity may also or instead utilize multiple sources, as described above with respect to Equations (118)-(122). Assessing S-wave amplitudes to resolve the 180-degree ambiguity may also or instead utilize dipole receivers, as described above with respect to Equations (123) and (124).

Figure 23:
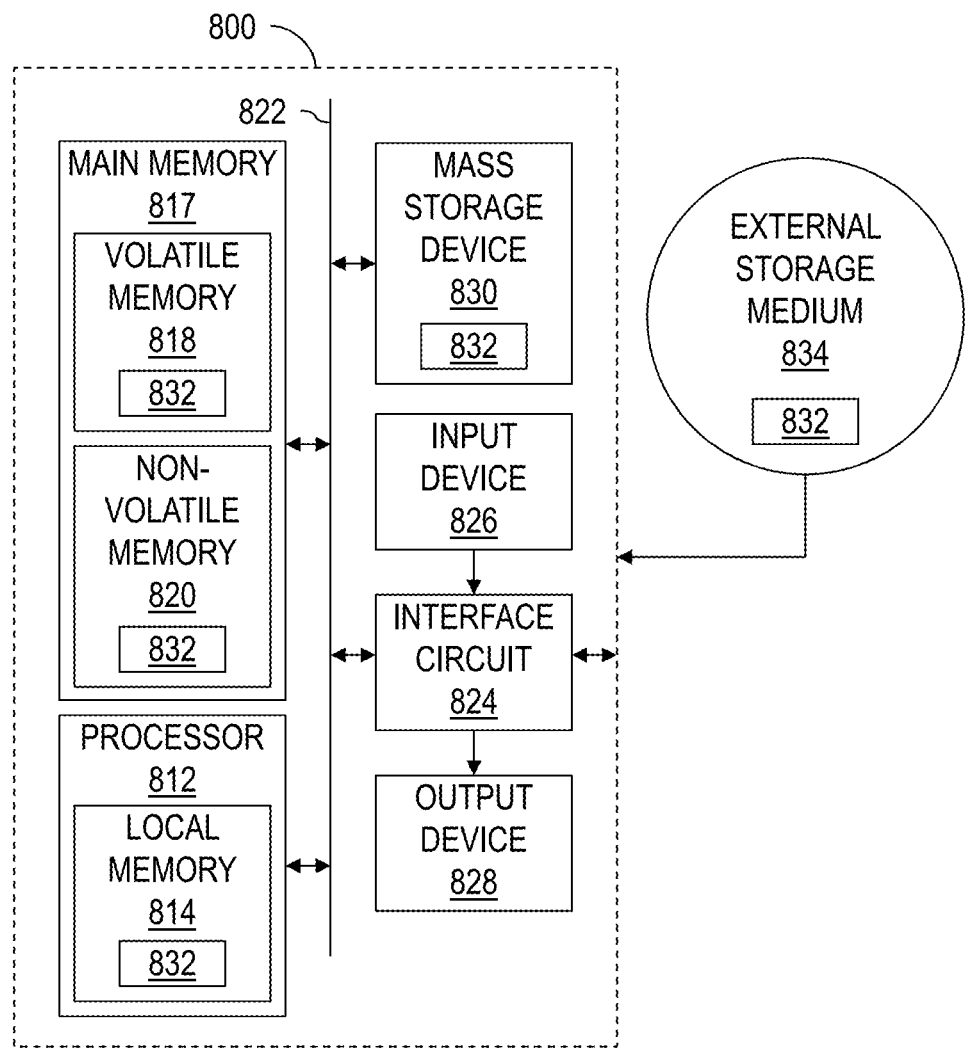
FIG. 23 is a schematic view of at least a portion of an example implementation of apparatus according to one or more aspects of the present disclosure.

FIG. 23 is a schematic view of at least a portion of an example implementation of a processing system 800 according to one or more aspects of the present disclosure. The processing system 800 may execute example machine-readable instructions to implement at least a portion of one or more of the methods and/or processes described herein, and/or to implement a portion of one or more of the example downhole tools described herein. The processing system 800 may be or comprise, for example, one or more processors, controllers, special-purpose computing devices, servers, personal computers, personal digital assistant (PDA) devices, smartphones, internet appliances, and/or other types of computing devices. Moreover, while it is possible that the entirety of the processing system 800 shown in FIG. 23 is implemented within downhole apparatus described above, one or more components or functions of the processing system 800 may also or instead be implemented in wellsite surface equipment, perhaps including the surface equipment 190 depicted in FIG. 1, the surface equipment 290 depicted in FIG. 2, and/or other surface equipment.

The processing system 800 may comprise a processor 812, such as a general-purpose programmable processor, for example. The processor 812 may comprise a local memory 814, and may execute program code instructions 832 present in the local memory 814 and/or another memory device. The processor 812 may execute, among other things, machine-readable instructions or programs to implement the methods and/or processes described herein. The programs stored in the local memory 814 may include program instructions or computer program code that, when executed by an associated processor, cause a controller and/or control system implemented in surface equipment and/or a downhole tool to perform tasks as described herein. The processor 812 may be, comprise, or be implemented by one or more processors of various types operable in the local application environment, and may include one or more general-purpose processors, special-purpose processors, microprocessors, digital signal processors (DSPs), field-programmable gate arrays (FPGAs), application-specific integrated circuits (ASICs), processors based on a multi-core processor architecture, and/or other processors.

The processor 812 may be in communication with a main memory 817, such as via a bus 822 and/or other communication means. The main memory 817 may comprise a volatile memory 818 and a non-volatile memory 820. The volatile memory 818 may be, comprise, or be implemented by random access memory (RAM), static random access memory (SRAM), synchronous dynamic random access memory (SDRAM), dynamic random access memory (DRAM), RAMBUS dynamic random access memory (RDRAM), and/or other types of random access memory devices. The non-volatile memory 820 may be, comprise, or be implemented by read-only memory, flash memory, and/or other types of memory devices. One or more memory controllers (not shown) may control access to the volatile memory 818 and/or the non-volatile memory 820.

The processing system 800 may also comprise an interface circuit 824. The interface circuit 824 may be, comprise, or be implemented by various types of standard interfaces, such as an Ethernet interface, a universal serial bus (USB), a third generation input/output (3GIO) interface, a wireless interface, and/or a cellular interface, among other examples. The interface circuit 824 may also comprise a graphics driver card. The interface circuit 824 may also comprise a communication device, such as a modem or network interface card, to facilitate exchange of data with external computing devices via a network, such as via Ethernet connection, digital subscriber line (DSL), telephone line, coaxial cable, cellular telephone system, and/or satellite, among other examples.

One or more input devices 826 may be connected to the interface circuit 824. One or more of the input devices 826 may permit a user to enter data and/or commands for utilization by the processor 812. Each input device 826 may be, comprise, or be implemented by a keyboard, a mouse, a touchscreen, a track-pad, a trackball, an image/code scanner, and/or a voice recognition system, among other examples.

One or more output devices 828 may also be connected to the interface circuit 824. One or more of the output devices 828 may be, comprise, or be implemented by a display device, such as a liquid crystal display (LCD), a light-emitting diode (LED) display, and/or a cathode ray tube (CRT) display, among other examples. One or more of the output devices 828 may also or instead be, comprise, or be implemented by a printer, speaker, and/or other examples.

The processing system 800 may also comprise a mass storage device 830 for storing machine-readable instructions and data. The mass storage device 830 may be connected to the interface circuit 824, such as via the bus 822. The mass storage device 830 may be or comprise a floppy disk drive, a hard disk drive, a compact disk (CD) drive, and/or digital versatile disk (DVD) drive, among other examples. The program code instructions 832 may be stored in the mass storage device 830, the volatile memory 818, the non-volatile memory 820, the local memory 814, and/or on a removable storage medium 834, such as a CD or DVD.

The mass storage device 830, the volatile memory 818, the non-volatile memory 820, the local memory 814, and/or the removable storage medium 834 may each be a tangible, non-transitory storage medium. The modules and/or other components of the processing system 800 may be implemented in accordance with hardware (such as in one or more integrated circuit chips, such as an ASIC), or may be implemented as software or firmware for execution by a processor. In the case of firmware or software, the implementation can be provided as a computer program product including a computer readable medium or storage structure containing computer program code (i.e., software or firmware) for execution by the processor.

In view of the entirety of the present disclosure, including the figures and the claims, a person having ordinary skill in the art will readily recognize that the present disclosure introduces a method comprising: estimating event amplitudes associated with a reflector in a subterranean formation, wherein the events are detected by azimuthally distributed receivers of an acoustic tool in a wellbore penetrating the subterranean formation; identifying which receiver is closest to an azimuthal position of the reflector based on the estimated event amplitudes; and determining the azimuthal position of the reflector using data obtained from: (i) the receiver identified as closest to the azimuthal position of the reflector; and (ii) two others of the receivers that are azimuthally adjacent the receiver identified as closest to the azimuthal position of the reflector.

Determining the azimuthal position of the reflector may comprise: selecting three adjacent ones of the receivers for which the event signals have larger P- or SV-wave amplitudes than for the other receivers; fitting the P- or SV-wave amplitudes of the selected receivers to a curve relating P- or SV-wave amplitude to azimuth; and determining the azimuthal position of the reflector using the curve. In such implementations, among others within the scope of the present disclosure, determining the azimuthal position of the reflector may further comprise assessing S-wave amplitudes of ones of the receivers to resolve 180-degree ambiguity of the curve. Assessing the S-wave amplitudes may comprise assessing S-wave amplitudes from each of the receivers, assessing S-wave amplitudes from dipole pairs of the receivers, assessing S-wave amplitudes resulting from multiple acoustic sources of the acoustic tool, and/or assessing the S-wave amplitudes utilizing 4-C dipole data.

Identifying the receiver closest to the azimuthal position of the reflector may comprise identifying the receiver associated with the largest estimated event amplitude.

Identifying the receiver closest to the azimuthal position of the reflector may comprise identifying the receiver having an estimated event amplitude closest to the root mean square of the estimated event amplitudes of the collective receivers.

The method may comprise filtering waveforms obtained via each of the receivers, and the estimated event amplitudes may be estimated event signal amplitudes obtained from the filtered waveforms.

The method may comprise filtering waveforms obtained via each of the receivers, and migrating the filtered waveforms to create an azimuthally complete image, and the estimated event amplitudes may be estimated from the azimuthally complete image. The method may further comprise estimating dip of the reflector using the azimuthally complete image.

The present disclosure also introduces an apparatus comprising a processing system having a processor and a memory including computer program code executable by the processor for: estimating event amplitudes associated with a reflector in a subterranean formation, wherein the events are detected by azimuthally distributed receivers of an acoustic tool in a wellbore penetrating the subterranean formation; identifying which receiver is closest to an azimuthal position of the reflector based on the estimated event amplitudes; and determining the azimuthal position of the reflector using data obtained from: (i) the receiver identified as closest to the azimuthal position of the reflector; and (ii) two others of the receivers that are azimuthally adjacent the receiver identified as closest to the azimuthal position of the reflector.

Determining the azimuthal position of the reflector may comprise: selecting three adjacent ones of the receivers for which the event signals have larger P- or SV-wave amplitudes than for the other receivers; fitting the P- or SV-wave amplitudes of the selected receivers to a curve relating P- or SV-wave amplitude to azimuth; and determining the azimuthal position of the reflector using the curve. In such implementations, among others within the scope of the present disclosure, determining the azimuthal position of the reflector may further comprise assessing S-wave amplitudes of ones of the receivers to resolve 180-degree ambiguity of the curve. Assessing the S-wave amplitudes may comprise one or more of: assessing S-wave amplitudes from each of the receivers; assessing S-wave amplitudes from dipole pairs of the receivers; assessing S-wave amplitudes resulting from multiple acoustic sources of the acoustic tool; and/or assessing the S-wave amplitudes utilizing 4-C dipole data.

Identifying the receiver closest to the azimuthal position of the reflector may comprise identifying the receiver associated with the largest estimated event amplitude, and/or identifying the receiver having an estimated event amplitude closest to the root mean square of the estimated event amplitudes of the collective receivers.

The computer program code may be executable by the processor for filtering waveforms obtained via each of the receivers, and the estimated event amplitudes may be estimated event signal amplitudes obtained from the filtered waveforms.

The computer program code may be executable by the processor for filtering waveforms obtained via each of the receivers and migrating the filtered waveforms to create an azimuthally complete image, and the estimated event amplitudes may be estimated from the azimuthally complete image.

The present disclosure also introduces a program product comprising a non-transitory, tangible, computer-readable medium having instructions encoded thereon for causing a processing system having a processor and a memory to: estimate event amplitudes associated with a reflector in a subterranean formation, wherein the events are detected by azimuthally distributed receivers of an acoustic tool in a wellbore penetrating the subterranean formation; identify which receiver is closest to an azimuthal position of the reflector based on the estimated event amplitudes; and determine the azimuthal position of the reflector using data obtained from: (i) the receiver identified as closest to the azimuthal position of the reflector; and (ii) two others of the receivers that are azimuthally adjacent the receiver identified as closest to the azimuthal position of the reflector.

Determining the azimuthal position of the reflector may comprise: selecting three adjacent ones of the receivers for which the event signals have larger P- or SV-wave amplitudes than for the other receivers; fitting the P- or SV-wave amplitudes of the selected receivers to a curve relating P- or SV-wave amplitude to azimuth; and determining the azimuthal position of the reflector using the curve. Determining the azimuthal position of the reflector may further comprise assessing S-wave amplitudes of ones of the receivers to resolve 180-degree ambiguity of the curve. Assessing the S-wave amplitudes may comprise one or more of: assessing S-wave amplitudes from each of the receivers; assessing S-wave amplitudes from dipole pairs of the receivers; assessing S-wave amplitudes resulting from multiple acoustic sources of the acoustic tool; and/or assessing the S-wave amplitudes utilizing 4-C dipole data;

Identifying the receiver closest to the azimuthal position of the reflector may comprise identifying the receiver associated with the largest estimated event amplitude, and/or identifying the receiver having an estimated event amplitude closest to the root mean square of the estimated event amplitudes of the collective receivers.

The encoded instructions may cause the processing system to filter waveforms obtained via each of the receivers, and perhaps to migrate the filtered waveforms to create an azimuthally complete image. The estimated event amplitudes may be estimated from the filtered waveforms or the azimuthally complete image.

The foregoing outlines features of several embodiments so that a person having ordinary skill in the art may better understand the aspects of the present disclosure. A person having ordinary skill in the art should appreciate that they may readily use the present disclosure as a basis for designing or modifying other processes and structures for carrying out the same functions and/or achieving the same benefits of the embodiments introduced herein. A person having ordinary skill in the art should also realize that such equivalent constructions do not depart from the spirit and scope of the present disclosure, and that they may make various changes, substitutions and alterations herein without departing from the spirit and scope of the present disclosure.

The Abstract at the end of this disclosure is provided to comply with 37 C.F.R. § 1.72(b) to permit the reader to quickly ascertain the nature of the technical disclosure. It is submitted with the understanding that it will not be used to interpret or limit the scope or meaning of the claims.

What is claimed is:

1. A method comprising:
estimating event amplitudes associated with a reflector in a subterranean formation, wherein the events are detected by azimuthally distributed receivers of an acoustic tool in a wellbore penetrating the subterranean formation;
identifying which receiver is closest to an azimuthal position of the reflector based on the estimated event amplitudes;
determining the azimuthal position of the reflector using data obtained from:
the receiver identified as closest to the azimuthal position of the reflector; and
two others of the receivers that are azimuthally adjacent the receiver identified as closest to the azimuthal position of the reflector;
selecting three adjacent ones of the receivers for which the event signals have larger P- or SV-wave amplitudes than for the other receivers;
fitting the P- or SV-wave amplitudes of the selected receivers to a curve relating P- or SV-wave amplitude to azimuth; and
determining the azimuthal position of the reflector using the curve.

2. The method of claim 1 wherein determining the azimuthal position of the reflector further comprises assessing S-wave amplitudes of ones of the receivers to resolve 180-degree ambiguity of the curve.

3. The method of claim 2 wherein assessing the S-wave amplitudes comprises assessing S-wave amplitudes from each of the receivers.

4. The method of claim 2 wherein assessing the S-wave amplitudes comprises assessing S-wave amplitudes from dipole pairs of the receivers.

5. The method of claim 2 wherein assessing the S-wave amplitudes comprises assessing S-wave amplitudes resulting from multiple acoustic sources of the acoustic tool.

6. The method of claim 2 wherein assessing the S-wave amplitudes utilizes 4-C dipole data.

7. The method of claim 1 wherein identifying the receiver closest to the azimuthal position of the reflector comprises identifying the receiver associated with the largest estimated event amplitude.

8. The method of claim 1 wherein identifying the receiver closest to the azimuthal position of the reflector comprises identifying the receiver having an estimated event amplitude closest to the root mean square of the estimated event amplitudes of the collective receivers.

9. The method of claim 1 further comprising filtering waveforms obtained via each of the receivers, wherein the estimated event amplitudes are estimated event signal amplitudes obtained from the filtered waveforms.

10. The method of claim 1 further comprising:
filtering waveforms obtained via each of the receivers; and
migrating the filtered waveforms to create an azimuthally complete image;

wherein the estimated event amplitudes are estimated from the azimuthally complete image.

11. The method of claim 10 further comprising estimating dip of the reflector using the azimuthally complete image.

12. An apparatus comprising:
a processing system comprising a processor and a memory including computer program code executable by the processor for:
estimating event amplitudes associated with a reflector in a subterranean formation, wherein the events are detected by azimuthally distributed receivers of an acoustic tool in a wellbore penetrating the subterranean formation;
identifying which receiver is closest to an azimuthal position of the reflector based on the estimated event amplitudes;
determining the azimuthal position of the reflector using data obtained from:
the receiver identified as closest to the azimuthal position of the reflector; and
two others of the receivers that are azimuthally adjacent the receiver identified as closest to the azimuthal position of the reflector;
selecting three adjacent ones of the receivers for which the event signals have larger P- or SV-wave amplitudes than for the other receivers;
fitting the P- or SV-wave amplitudes of the selected receivers to a curve relating P- or SV-wave amplitude to azimuth; and
determining the azimuthal position of the reflector using the curve.

13. The apparatus of claim 12 wherein:
determining the azimuthal position of the reflector further comprises assessing S-wave amplitudes of ones of the receivers to resolve 180-degree ambiguity of the curve; and
assessing the S-wave amplitudes comprises one or more of:
assessing S-wave amplitudes from each of the receivers;
assessing S-wave amplitudes from dipole pairs of the receivers;
assessing S-wave amplitudes resulting from multiple acoustic sources of the acoustic tool; and/or
assessing the S-wave amplitudes utilizing 4-C dipole data.

14. The apparatus of claim 12 wherein identifying the receiver closest to the azimuthal position of the reflector comprises:
identifying the receiver associated with the largest estimated event amplitude; or
identifying the receiver having an estimated event amplitude closest to the root mean square of the estimated event amplitudes of the collective receivers.

15. The apparatus of claim 12 wherein the computer program code is further executable by the processor for filtering waveforms obtained via each of the receivers, wherein the estimated event amplitudes are estimated event signal amplitudes obtained from the filtered waveforms.

16. The apparatus of claim 12 wherein the computer program code is further executable by the processor for:
filtering waveforms obtained via each of the receivers; and migrating the filtered waveforms to create an azimuthally complete image;
wherein the estimated event amplitudes are estimated from the azimuthally complete image.

17. An apparatus comprising:
a non-transitory, tangible, computer-readable medium having instructions encoded thereon for causing a processing system having a processor and a memory to:
estimate event amplitudes associated with a reflector in a subterranean formation, wherein the events are detected by azimuthally distributed receivers of an acoustic tool in a wellbore penetrating the subterranean formation;
identify which receiver is closest to an azimuthal position of the reflector based on the estimated event amplitudes;
determine the azimuthal position of the reflector using data obtained from:
the receiver identified as closest to the azimuthal position of the reflector; and
two others of the receivers that are azimuthally adjacent the receiver identified as closest to the azimuthal position of the reflector;
selecting three adjacent ones of the receivers for which the event signals have larger P- or SV-wave amplitudes than for the other receivers;
fitting the P- or SV-wave amplitudes of the selected receivers to a curve relating P- or SV-wave amplitude to azimuth; and
determining the azimuthal position of the reflector using the curve.

18. The apparatus of claim 17 wherein:
determining the azimuthal position of the reflector comprises:
assessing S-wave amplitudes of ones of the receivers to resolve 180-degree ambiguity of the curve, wherein assessing the S-wave amplitudes comprises one or more of:
assessing S-wave amplitudes from each of the receivers;
assessing S-wave amplitudes from dipole pairs of the receivers;
assessing S-wave amplitudes resulting from multiple acoustic sources of the acoustic tool; and/or
assessing the S-wave amplitudes utilizing 4-C dipole data;
identifying the receiver closest to the azimuthal position of the reflector comprises:
identifying the receiver associated with the largest estimated event amplitude; or
identifying the receiver having an estimated event amplitude closest to the root mean square of the estimated event amplitudes of the collective receivers;
the encoded instructions are further for causing the processing system to:
filter waveforms obtained via each of the receivers; and
migrate the filtered waveforms to create an azimuthally complete image; and
the estimated event amplitudes are estimated from the filtered waveforms or the azimuthally complete image.

* * * * *